United States Patent
Reynolds et al.

(10) Patent No.: US 7,630,186 B2
(45) Date of Patent: Dec. 8, 2009

(54) CURRENT PROTECTION APPARATUS AND METHOD

(75) Inventors: Gregory A. Reynolds, Saratoga, CA (US); Charles H. Reynolds, Gilroy, CA (US); Ron L. Silorio, Pittsburgh, CA (US)

(73) Assignee: Cyber Switching, Inc., San Jose, CA (US)

( * ) Notice: Subject to any disclaimer, the term of this patent is extended or adjusted under 35 U.S.C. 154(b) by 235 days.

(21) Appl. No.: 11/437,958

(22) Filed: May 19, 2006

(65) Prior Publication Data
US 2008/0019067 A1    Jan. 24, 2008

(51) Int. Cl.
*H02H 3/08* (2006.01)
*H02H 9/02* (2006.01)
*H02H 9/08* (2006.01)

(52) U.S. Cl. .................. 361/93.1; 361/93.5; 361/93.7; 361/93.9

(58) Field of Classification Search .......... None
See application file for complete search history.

(56) References Cited

U.S. PATENT DOCUMENTS

| | | | |
|---|---|---|---|
| 4,060,844 A | 11/1977 | Davis et al. | |
| 4,258,403 A | 3/1981 | Shimp | |
| 4,318,156 A | 3/1982 | Gallagher | |
| 4,429,340 A | 1/1984 | Howell | |
| 5,185,705 A | 2/1993 | Farrington | |
| 5,309,312 A * | 5/1994 | Wilkerson et al. | 361/79 |
| 5,475,609 A | 12/1995 | Apothaker | |
| 5,521,838 A | 5/1996 | Rosendahl | |
| 5,596,473 A | 1/1997 | Johnson et al. | |
| 5,644,463 A * | 7/1997 | El-Sharkawi et al. | 361/94 |
| 5,825,643 A | 10/1998 | Dvorak et al. | |
| 5,844,326 A * | 12/1998 | Proctor et al. | 307/34 |
| 5,994,790 A * | 11/1999 | Nagashima et al. | 307/10.1 |
| 6,297,939 B1 | 10/2001 | Bilac et al. | |
| 6,545,445 B1 * | 4/2003 | McDermott et al. | 320/103 |
| 6,611,411 B2 * | 8/2003 | Williams et al. | 361/93.1 |
| 6,771,052 B2 * | 8/2004 | Ostojic | 323/266 |
| 7,043,543 B2 * | 5/2006 | Ewing et al. | 709/223 |
| 2002/0002593 A1 | 1/2002 | Ewing et al. | |
| 2004/0047095 A1 | 3/2004 | Reynolds et al. | |
| 2005/0280970 A1 | 12/2005 | Reynolds | |

OTHER PUBLICATIONS

U.S. Appl. No. 60/378,342, Reynolds et al.
U.S. Appl. No. 10/431,333, Reynolds et al.
U.S. Appl. No. 10/870,853, Gregory A. Reynolds.
Mano Moris, Computer System Architecture, 1982, Prentice-Hall, Inc. pp. 261-262.

* cited by examiner

*Primary Examiner*—Albert W Paladini
*Assistant Examiner*—Dharti H Patel
(74) *Attorney, Agent, or Firm*—Darryl G. Walker

(57) ABSTRACT

A current protection apparatus (200) and current protection method (1000) that may include programmable current protection characteristics has been disclosed. A current protection apparatus (200) may include a power distribution unit (230) with power distribution outlets (PDO-1 to PDO-8), each having a corresponding circuit breaker unit (CB1 to CB8). Each circuit breaker unit (CB1 to CB8) may operate in response to a processing unit (236) that can sample current values flowing between a respective power distribution outlet (PDO-1 to PDO-8) and a load device (LD1 to LD8). Processing unit 236 may operate under control of software stored on a memory (238) to control a switching circuit (320). Current protection characteristics for each circuit breaker unit may be independently programmed and/or altered by a user, for example by way of a computer (250). In this way, each power distribution outlet (PDO-1 to PDO-8) may have current rating characteristics independently provided for a particular load device (LD1 to LD8).

11 Claims, 30 Drawing Sheets

```
                    Tri Com 8 Serial Interface
SETTINGS-Phone

[X] Enable Phone Interface
 [ ] Allow Calls with no caller ID information.

Phone PIN: ****************

Phone Settings Help:
The Phone Interface allows a caller to control the SPS-8.
To log into the phone interface, a caller must enter the Phone PIN.
Once logged in, a caller can change/query the states of all outlets.
Caller ID information is usually used for logging purposes. By choosing
the appropriate option above, calls without Caller ID can be rejected for
security reasons.

Press Backspace to return to Settings Menu.
```

*FIG. 5*

```
                    DUALCOM-8 Serial Interface
SETTINGS-EMAIL

[X] Send email when log buffer is full

Email Server  : smtp.domain.com
 Email Address : administrator@domain.com
 From Address  : DUALCOM-8@domain.com
 Subject       : DUALCOM-8 Log Dump Email Settings Help:
The DUALCOM-8 can dump logs to email when the log buffer becomes full.
Fill out the information above to have logs emailed to you.

Press Backspace to return to Settings Menu.
```

*FIG. 6*

```
MODIFY USER 1

Username: Robert Ricks
        Password: ********
Retype Password: ********
   Administrator: [x]
User can modify these outlets (Administrators can modify ALL outlets):
 1   2   3   4   5   6   7   8
[x] [x] [x] [x] [ ] [x] [ ] [x]

[SAVE USER]
_____

Modify User Help:
 You MUST choose [SAVE USER] for user settings changes to apply.
 Use arrow keys to navigate.
 Press Enter to change setting.
 Press Backspace to cancel and return to Settings Menu.
```

*FIG. 8*

| | | | | | | |
|---|---|---|---|---|---|---|
| DUALCOM | | | | | CYBER⊚SWITCHING | |
| OUTLETS | LOGS | | USERS | SETUP | USER: Roburk 9:26 PM • Thu 10/31/2002 | |
| 1 | ⊙ | ON | OFF | ✎ | Web Server | 0.0A |
| 2 | ⊙ | ON | OFF | ✎ | Router | 0.5A |
| 3 | ⊙ | ON | OFF | ✎ | Com Sever 1 | 0.0A |
| 4 | ⊙ | ON | OFF | ✎ | Com Server 2 | 0.0A |
| 5 | ⊙ | ON | OFF | ✎ | Darwin Server | 0.0A |
| 6 | ⊙ | ON | OFF | ✎ | Hub #1 | 0.0A |
| 7 | ⊙ | ON | OFF | ✎ | Accounting 1 | 0.0A |
| 8 | ⊙ | ON | OFF | ✎ | Room Camera | 0.0A |
| | | | | | Total | 0.5A |

*FIG. 9*

☑ Enable Scheduling for Outlet: 1

New event: [Turn outlet ON ▼] at [12] : [00] [AM ▼], every [Sunday ▼]   [Add Event]

Schedule: [Save Schedule Options]   [Cancel]

✗ ⊙ Sunday 12:00 A.M. - Turn Outlet ON

*FIG. 10*

Outlet Label: [OUTLET 1]

■ Enable Low Current Alerts

Low Current (Amps):       Low Grace Period(ms):
[0.3]                     [10000]

■ Enable High Current Alerts

High Current (Amps):      High Grace Period(ms):
[20]                      [10000]

[Save Properties]                              [Cancel]

*FIG. 11*

| | | | Outlet Permissions | | | | | | | | | |
|---|---|---|---|---|---|---|---|---|---|---|---|---|
| Username | Administrator | 1 | 2 | 3 | 4 | 5 | 6 | 7 | 8 | | | |
| 1. admin1 | ● | ● | ● | ● | ● | ● | ● | ● | ● | Edit | Delete |
| 2. RobRicks | ● | ● | ● | ● | ● | ● | ● | ● | ● | Edit | Delete |
| 3. <empty> | | | | | | | | | | Edit | Delete |
| 4. <empty> | | | | | | | | | | Edit | Delete |
| 5. <empty> | | | | | | | | | | Edit | Delete |
| 6. <empty> | | | | | | | | | | Edit | Delete |

*FIG. 13*

Username — Ron Silorio

Password — ********
Retype Password — ********

■ User is administrator

User may modify these outlets:
(administrators can modify all outlets regardless of these settings)

| 1 | 2 | 3 | 4 | 5 | 6 | 7 | 8 |
|---|---|---|---|---|---|---|---|
| ☑ | ☑ | ■ | ■ | ■ | ■ | ■ | ■ |

Save User — Cancel

*FIG. 14*

| DUALCOM | CYBER⊕SWITCHING |
|---|---|
| | USER: admin1 |

OUTLETS  LOGS  USERS  SETUP

TIME/DATE     Edit

Thu, 31 Oct 2002 • 8:46 PM
    Time Zone: GMT-08:00
Daylight Savings: Enabled

NTP: Disabled
NTP Server 1: 255.255.255.255
NTP Server 2: my.NTP.server

NETWORK     Edit

MAC Address: 00-09-E6-00-01-17
       DHCP: Disabled

|  | DEFAULTS | ACTIVE |
|---|---|---|
| IP: | 198.144.195.110 | 198.144.195.110 |
| Subnet Mask: | 255.255.255.248 | 255.255.255.248 |
| Gateway: | 198.144.195.105 | 198.144.195.105 |
| DNS: | 198.144.192.2 | 198.144.192.2 |
| Host: | DUALCOM-8-1 | DUALCOM-8-1 |
| Domain: | ???.com | ???.com |

LOGGING     Edit

Syslog Server: 255.255.255.255
Logging Facility: 16
Logging Level: 6

Email Logs: Don't dump logs to email when buffer is full
SMTP Server: smtp.???.com
       To: administrator@???.com
   From: DUALCOM-8@???.com
 Subject: DUALCOM-8 Log Dump

SNMP     Edit

*FIG. 15*

| IP: | 192.168.1.1 |
| --- | --- |
| Subnet Mask: | 255.255.255.0 |
| Gateway: | 192.168.2.1 |
| DNS: | 192.168.1.1 |
| Host: | TRICOM-8-1 |
| Domain: | domain.com |

Save     Cancel

Note: Network settings won't take affect until you reboot.

Save and Reboot

Warning: If you choose "Save and Reboot", first power down all attached devices as rebooting will temporarily affect outlet states.

*FIG. 16*

☑ Enable Interface
■ Allow callers with no caller ID.
Phone PIN: ***************

Save     Cancel

*FIG. 17*

☑ Dump logs to email when buffer is full.

| | |
|---|---|
| SMTP Server: | smtp.domain.com |
| To: | admin@domain.com |
| From: | TRICOM-8@domain.com |
| Subject: | TRICOM-8 Log Dump |

[Save]  [Cancel]

*FIG. 18*

☑ DCHP Enabled

| | |
|---|---|
| IP: | 192.168.1.0 |
| Subnet Mask: | 255.255.255.0 |
| Gateway: | 192.168.1.1 |
| DNS: | 192.168.1.1 |
| Host: | DUALCOM-8-1 |
| Domain: | domain.com |

[Save]  [Cancel]

Note: Network settings won't take affect until you reboot.

[Save and Reboot]

Warning: If you choose "Save and Reboot", first power down all attached devices as rebooting will temporarily affect outlet states.

*FIG. 19*

☑ Enable SNMP
■ Use Concatenated Username&Password as Communities
(Communities 1 & 2 below will be ignored)

Community 1: public     ■ write access
    Community 2: private     ☑ write access
    Trap Host IP:
    (Leave blank to disable traps)

Save             Cancel

*FIG. 20*

■ Require confirmation to change outlets from web page.
Outlets page refresh rate in seconds (1-999): 10
Save             Cancel

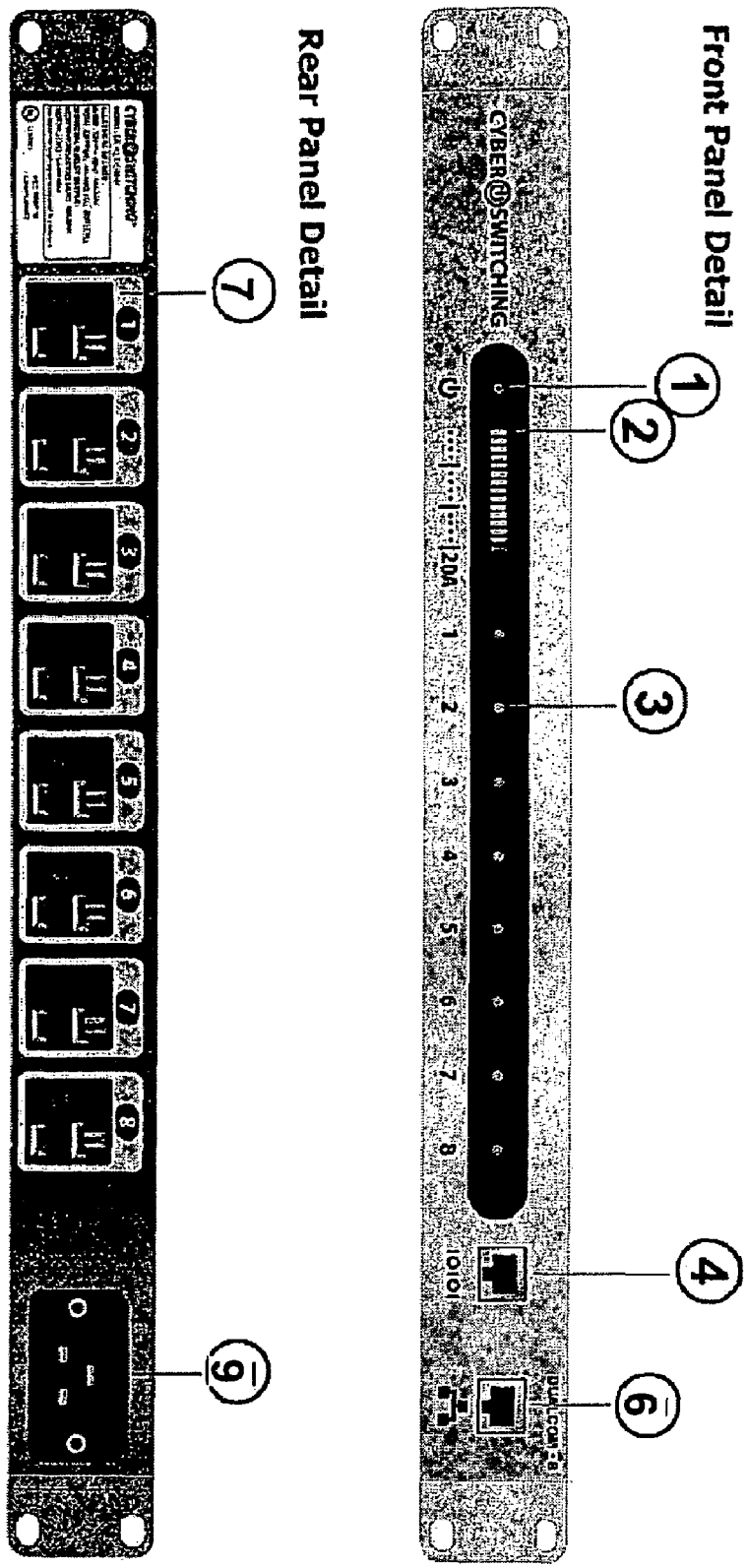
*FIG. 23A*  *FIG. 23B*

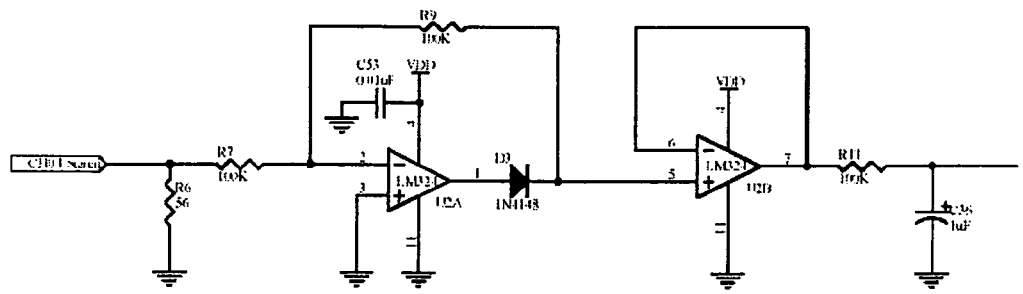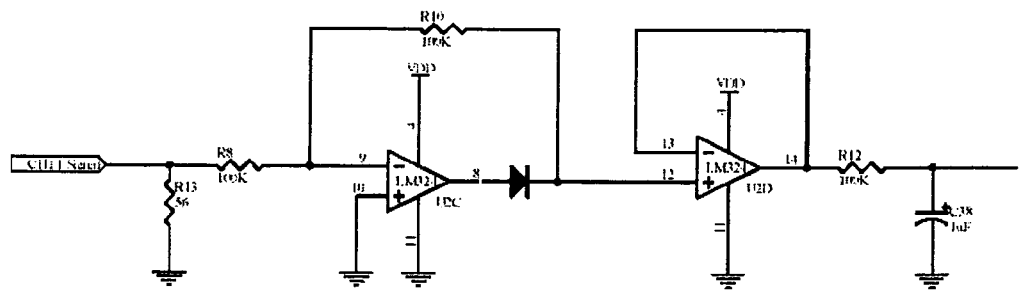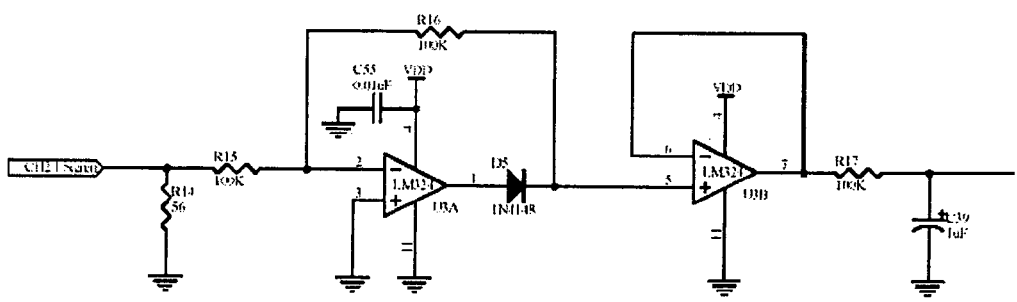
*FIG. 28A*

|   | 510 | 520 | 530 | 540 | 550 | 560 | 500 | 570 |
|---|---|---|---|---|---|---|---|---|
| 1 |  | ON | OFF | ■ | OUTLET 1 | | 0.0A |
| 2 |  | ON | OFF | ■ | OUTLET 2 | | 0.0A |
| 3 |  | ON | OFF | ■ | OUTLET 3 | | 0.0A |
| 4 |  | ON | OFF | ■ | OUTLET 4 | | 0.0A |
| | | | | | Bank A Total | | 0.0A |
| 5 |  | ON | OFF | ■ | OUTLET 5 | | 0.0A |
| 6 |  | ON | OFF | ■ | OUTLET 6 | | 0.0A |
| 7 |  | ON | OFF | ■ | OUTLET 7 | | 0.0A |
| 8 |  | ON | OFF | ■ | OUTLET 8 | | 0.0A |
| | | | | | Bank B Total | | 0.0A |
| ALL | | ON | OFF | ■ | Unit Total | | 0.0A |

FIG. 34

CURRENT PROTECTION APPARATUS AND METHOD

CROSS REFERENCE TO RELATED APPLICATIONS

This application claims priority from provisional patent application 60/378,342, filed May 6, 2002, U.S. patent application Ser. No. 10/431,333, filed May 6, 2003, and U.S. patent application Ser. No. 10/870,853 filed Jun. 16, 2004, all of which the contents are incorporated by reference herein.

TECHNICAL FIELD

The present invention relates generally to a current protection apparatus and more particularly to a current protection apparatus including a programmable characteristic and current protection method.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND OF THE INVENTION

Early in the development of modern networking equipment such as routers, it was realized that at times a particular piece of network equipment might hang or "crash." In such instances, a human operator often had to intervene by traveling to the location of the equipment and rebooting or power cycling the equipment in order to get that particular piece of equipment working. Power cycling and information about consumed power are also of interest in a number of computer equipment and other equipment settings.

The discussion of any work, publications, sales, or activity anywhere in this submission, including in any documents submitted with this application, shall not be taken as an admission that any such work constitutes prior art. The discussion of any activity, work, or publication herein is not an admission that such activity, work, or publication existed or was known in any particular jurisdiction.

A power distribution unit (PDU) can be used to provide power management to a plurality of devices. Referring now to FIG. 30, a block schematic diagram of an apparatus including a conventional PDU for power management to a plurality of devices is set forth and given the general reference character 100.

Apparatus 100 includes a conventional PDU 130 that is connected to a wall outlet 110 through a power cord 120 at inlet 132. Wall outlet 110 can be connected to a 120 Volt Alternating Current (120 VAC) as a power supply voltage, as but one example. Conventional PDU 130 includes eight power distribution outlets (PDO-1 to PDO-8). Each power distribution outlet (PDO-1 to PDO-8) can be connected to a respective load device (LD1 to LD8) through a respective power cord (PC-1 to PC-8).

Conventional PDU 130 also includes a circuit breaker 134. Circuit breaker 134 is connected between the inlet 132 and the power distribution outlets (PDO-1 to PDO-8). In this way, the sum of the currents flowing from each power distribution outlet (PDO-1 to PDO-8) to the respective load device (LD1 to LD8) flows through circuit breaker 134.

Circuit breaker 134 "trips" or becomes an open circuit when the current exceeds the overcurrent rating of the circuit breaker 134. When the circuit breaker 134 trips, the power supply voltage is disconnected from all of the power distribution outlets (PDO-1 to PDO-8) and all of the respective load devices (LD1 to LD8). In this way, even if, for example, load device LD3 is causing the overcurrent condition, all of the other load devices (LD1, LD2 and LD4 to LD8) also are disconnected from the power supply voltage.

Conventional PDU 130 has various drawbacks. For example, in the above-mentioned situation load device LD3 may not be a system critical device. However, load device LD4 may be system critical. In this case, a system critical load device LD4, such as a network server for example, is disconnected from the power supply when a less critical device is causing the overcurrent condition.

Another drawback for conventional PDU 130 is where one of the load devices, for example load device LD5, needs protection at a current lower than the overcurrent rating of circuit breaker 134. For example, load device LD5 could be connected to power distribution outlet PDO-5 with a power cord that is rated to only 5 amps, but circuit breaker 134 can have an overcurrent rating of 15 amps. In this case, load device LD5 may have a current exceeding 5 amps without causing circuit breaker 134 to trip if the other load devices (LD1 to LD4 or LD6 to LD8) collectively draw less than 10 amps. Of course, in the case where only load device LD5 is connected to conventional power distribution unit 130, load device LD5 would not have sufficient overcurrent protection under any condition.

Another drawback for conventional PDU 130 occurs when there is a temporary current surge in one of the load devices (LD1 to LD8). In this case, circuit breaker 134 can trip even though the current surge will not cause an electrical failure to the offending load device (LD1 to LD8). As previously mentioned, when circuit breaker 134 trips, all the load devices (LD1 to LD8) lose power.

In view of the above discussion, it would be desirable to provide a current protection apparatus that may provide individual and/or customized current protection to a load device.

It would also be desirable to provide a method of current protection that may provide individual and/or customized current protection to a load device.

It would also be desirable to provide a current protection apparatus and method of current protection that may provide protection from current surges that may damage an individual load device without unwarranted protection against a temporary current surge that may not be sufficient to cause an electrical failure of a load device. It would further be desirable to provide such protection in a power distribution unit.

It would also be desirable to provide a current protection apparatus and method of current protection for a power distribution unit that may provide individual and customized current protection to each load device connected to a power distribution outlet.

Additionally, a method, system, and apparatus for remote power management and monitoring has been set forth in commonly owned and co-pending U.S. patent application Ser. No. 10/625,837 filed Jul. 22, 2003, U.S. patent application Ser. No. 10/431,333 filed May 6, 2003, U.S. Provisional Patent Application Ser. No. 60/378,342 filed May 6, 2002, Canadian Patent Application Number 2,428,285 filed May 6, 2003, and European Patent Application Number 03252833.3 filed May 6, 2003. The full disclosures of these patent applications are incorporated by reference.

SUMMARY OF THE INVENTION

According to the present embodiments, a current protection apparatus and current protection method that may include programmable current protection characteristics is disclosed. A current protection apparatus may include a power distribution unit. A power distribution unit may include power distribution outlets, each having a corresponding circuit breaker unit. Each circuit breaker unit may operate in response to a processing unit to sample current values corresponding to a current flowing between a respective power distribution outlet and a load device. A processing unit may operate under control of software stored in a memory to control a switching circuit. Current protection characteristics for each circuit breaker unit may be independently programmed and/or altered by a user, for example by way of a computer. In this way, each power distribution outlet may have current rating characteristics independently provided for a particular load device.

According to one aspect of the embodiments, a current protection method may include the steps of sampling a current value of a current flowing from a power source to a load device for at least one current characteristic and interrupting the current flowing from the power source to the load device according to a comparison between the at least one current characteristic and at least one programmable limit.

According to another aspect of the embodiments, the at least one programmable limit may be a predetermined current limit value.

According to another aspect of the embodiments, the at least one programmable limit may include a predetermined time period and the current value may exceed a predetermined current limit value for essentially a predetermined time period.

According to another aspect of the embodiments, the step of sampling a current value of a current flowing from a power source to a load device for at least one current characteristic may be repeated a plurality of times during a predetermined time period.

According to another aspect of the embodiments, the step of sampling a current value may include taking current readings of the current flowing from the power source to the load device and performing parametric calculations to provide the current value.

According to another aspect of the embodiments, parametric calculations may include peak current root mean square current, and crest factor harmonic current.

According to another aspect of the embodiments, a current protection method may include the steps of sampling a first current value of a first current flowing from a first power distribution outlet to a first load device and a second current value of a second current flowing from a second power distribution outlet to a second load device, comparing the first current value with a first predetermined current limit value and a second current value with a second predetermined current limit value, and interrupting the first current flowing from the first power distribution outlet to the first load device in response to the first current value exceeding the first predetermined current limit value and interrupting the second current flowing from the second power distribution outlet to the second load device in response to the second current value exceeding the second predetermined current limit value.

According to another aspect of the embodiments, the first predetermined current limit value and the second predetermined current limit value are programmable.

According to another aspect of the embodiments, the step of comparing the first current value with a first predetermined current value and the second current value with a second predetermined current limit value may be performed with software.

According to another aspect of the embodiments, when the step of comparing the first current value results in the first current value exceeding the first predetermined current limit value, repeating the step of sampling the first current value and the step of comparing the first current value with the first predetermined current limit value after a first predetermined time period. When the step of comparing the second current value results in the second current value exceeding the second predetermined current limit value, repeating the step of sampling the second current value and the step of comparing the second current value with the second predetermined current limit value after a second predetermined time period. The first current flowing from the first power distribution outlet is interrupted only when the second step of comparing results in the first current value exceeding the first predetermined current limit value and the second current flowing from the second power distribution outlet is interrupted only when the second step of comparing results in the second current value exceeding the second predetermined current limit value.

According to another aspect of the embodiments, the first predetermined time period and the second predetermined time period may be the same.

According to another aspect of the embodiments, the first predetermined time period and the second predetermined time period may be different.

According to another aspect of the embodiments, the step of comparing the first current value with the first predetermined current limit value after the first predetermined time period and the step of sampling the second current value and the step of comparing the second current value with the second predetermined current limit value after the second predetermined time period may be performed with software.

According to another aspect of the embodiments, a current protection method for a power distribution unit may include the steps of sampling a plurality of current values for a plurality of currents, each of the plurality of currents comprising a current flowing between one of a plurality of power distribution outlets and a corresponding load device, comparing each of the plurality of current values with a corresponding one of a plurality of predetermined current limit values, and interrupting the current flowing between the corresponding power distribution outlet and the corresponding load device if the corresponding current value is greater than the corresponding predetermined current limit value.

According to another aspect of the embodiments, each of the plurality of predetermined current limit values may be programmable.

According to another aspect of the embodiments, the step of comparing each of the plurality of current values with the corresponding one of the plurality of predetermined current limit values may be performed with software.

According to another aspect of the embodiments, a current protection computer program embodied on a computer readable media may include: a reading code portion, for reading a plurality of current values for a plurality of currents, each of the plurality of currents comprising a current flowing between one of a plurality of power distribution outlets and a corresponding load device; and a comparing code portion, for comparing each of the plurality of current values with a corresponding one of a plurality of predetermined current limit values and providing an interrupt command for interrupting the current flowing between the corresponding power distribution outlet and the corresponding load device if the corresponding current value is greater than the corresponding predetermined current limit value.

According to another aspect of the embodiments, the reading code portion may read the plurality of current values during a predetermined time period and the comparing code portion may provide the interrupt command if the corresponding current value is greater than the corresponding predetermined current value for essentially the predetermined time period.

According to another aspect of the embodiments, a current protection apparatus may include a current sampling circuit, a processing unit, and a switching circuit. The current sampling circuit may sample a first current value of a current flowing from a power source to a first load device. A processing unit may receive the first current value and may be controlled by a software program to compare the first current value with a predetermined current limit value to generate a first compare result. A switching circuit may be coupled between the power source and the first load device. The switching device may interrupt the current flowing from the power source to the load device in response to at least the first compare result indicating that the first current value may exceed the predetermined current limit value.

According to another aspect of the embodiments, the current sampling circuit may sample a second current value of the current flowing from the power source to the first load device a first predetermined time period after the first current value is sampled. The processing unit may receive the second current value and may be controlled by the software program to compare the second current value with the predetermined current limit value to generate a second compare result. The switching circuit may interrupt the current flowing from the power source to the load device in response to the second compare result indicating that the second current value exceeds the predetermined current limit value.

According to another aspect of the embodiments, the current sampling circuit may sample a plurality of intermediate current values of the current flowing from the power source to the first load device during the first predetermined time period after the first current value is sampled. The processing unit may receive the plurality of intermediate current values and may be controlled by the software program to compare the plurality of intermediate current values with the predetermined current limit value to generate a plurality of intermediate compare results. The switching circuit may interrupt the current flowing form the power source to the load device in response to the plurality of intermediate compare results indicating each of the plurality of intermediate current values exceeds the predetermined current limit value and to the second compare result indicating that the second current value exceeds the predetermined current limit value.

According to another aspect of the embodiments, the current sampling circuit may include an analog to digital converter.

According to another aspect of the embodiments, the switching circuit may include a mechanical relay or a solid state relay.

According to another aspect of the embodiments, the current sampling circuit may include a current sensing circuit, such as an isolation step down transformer, a Hall effect device, a sense resistor, or a magnetometer.

According to another aspect of the embodiments, a current protection apparatus for a power distribution unit may include a current sampling circuit, a processing unit, a first switching circuit, and a second switching circuit. A current sampling circuit may sample a first current value of a first current flowing from a first power distribution outlet and a first load device and a second current flowing from a second power distribution outlet and a second load device. A processing unit may receive the first current value and the second current value. The processing unit may be controlled by a software program to compare the first current value with a first predetermined current limit value to generate a first comparison result and compare a second current value with a second predetermined current limit value to generate a second comparison result. The first switching circuit may be coupled between the first power distribution outlet and the first load device. The first switching circuit may interrupt the first current flowing from the first power distribution outlet to the first load device in response to at least the first compare result indicating that the first current value exceeds the first predetermined current limit value. The second switching circuit may be coupled between the second power distribution outlet and the second load device. The second switching circuit may interrupt the second current flowing from the second power distribution outlet to the second load device in response to at least the second compare result indicating that the second current value exceeds the second predetermined current limit value.

According to another aspect of the embodiments, the current sampling circuit may sample a third current value of the current flowing from the first power distribution outlet to the first load device a first predetermined time period after the first current value is sampled when the first current value exceeds the first predetermined current limit value and may sample a fourth current value of the current flowing from the second power distribution outlet to the second load device a second predetermined time period after the second current value is sampled when the second current value exceeds the second predetermined current limit value. The processing unit may receive the third current value if the first current value exceeds the first predetermined current limit value and may be controlled by the software program to compare the third current value with the first predetermined current limit value to generate a third comparison result and may receive the fourth current value if the second current value exceeds the second predetermined current limit value and may be controlled by the software program to compare the fourth current value with the second predetermined current limit value to generate a fourth comparison result. The first switching circuit may interrupt the first current flowing from the first power distribution outlet to the first load device in response to the third compare result indicating that the third current value exceeds the first predetermined current limit value. The second switching circuit may interrupt the second current flowing from the second power distribution outlet to the second load device in response to the fourth compare result indicating that the fourth current value exceeds the second predetermined current limit value.

According to another aspect of the embodiments, the power distribution unit may include the first power distribution outlet and the second power distribution outlet.

According to another aspect of the embodiments, a current protection apparatus for a power distribution unit may include a current sampling circuit, a processing unit, and a plurality of switching circuits. The current sampling circuit may sample a plurality of first current values, each first current value corresponding to a current flowing from one of a plurality of power distribution outlets to a corresponding one of a plurality of load devices. The processing unit may receive the plurality of first current values and may be controlled by a software program to compare each of the plurality of first current values with a corresponding one of a plurality of predetermined current limit values to generate a plurality of first compare results. Each one of the plurality of switching circuits may be coupled between one of the plurality of power distribution outlets and a corresponding one of the plurality of load devices. Each one of the plurality of switching devices may interrupt the corresponding one of the plurality of currents flowing between one of the plurality of power distribution outlets and the corresponding one of the plurality of load devices in response to at least the corresponding one of the plurality of first compare results indicating that the corresponding one of the plurality of first current values is greater than the corresponding one of the plurality of predetermined current limit values.

According to another aspect of the embodiments, when the corresponding one of the plurality of compare results indicates that the corresponding one of the plurality of current values is greater than the corresponding one of the plurality of current values, the current sampling circuit may sample at least a second current value corresponding to the current flowing from the one of the plurality of power distribution outlets to the corresponding one of the plurality of load devices a predetermined time period after the sampling of the corresponding first current value. The processing unit may be coupled to receive the at least second current value and may be controlled by the software program to compare the at least second current value with the corresponding one of a plurality of predetermined current limit values to generate a second compare result. The corresponding one of the plurality of switching devices may interrupt the corresponding one of the plurality of currents flowing between one of the plurality of power distribution outlets and the corresponding one of the plurality of load devices in response to at least the second compare result indicating that the second current value is greater than the corresponding one of the plurality of predetermined current limit values.

According to another aspect of the embodiments, the power distribution unit may include the plurality of power distribution outlets, the current sampling circuit, the processing unit, and the plurality of switching circuits.

The present invention relates to a method and/or system and/or apparatus for providing new capabilities in power supply and/or power cycling management. In specific embodiments, the invention involves a method and/or system and/or apparatus for remotely managing and monitoring a power supply over two or more different interfaces including, for example, a telephone interface and/or a network-based (e.g., HTTP, SNMP) interface and/or a serial interface. In further embodiments, the invention involves one or more methods that may be implemented using a data handling device or system, such as a computer or other information enabled device. In further embodiments, the invention involves methods and/or systems for power management over a communication network and/or telephone network.

Various strategies have been proposed for performing remote power switching and/or management and/or performing intelligent scheduling of the turning on and turning off of power cycling. According to specific embodiments, the present invention is involved with methods and/or systems and/or devices that can be used together or independently to monitor and/or control power supplies. In specific embodiments, the present invention can be understood as involving new methods related to power management.

A smart power supply according to specific embodiments of the invention further includes one or more novel features such as: individual current monitoring of power outlets; user adjustable stagger starting and/or outlet scheduling; and text-based menu drive telnet and serial interface.

The invention and various specific aspects and embodiments will be better understood with reference to the following drawings and detailed descriptions. For purposes of clarity, this discussion refers to devices, methods, and concepts in terms of specific examples. However, the invention and aspects thereof may have applications to a variety of types of devices and systems. It is therefore intended that the invention not be limited except as provided in the attached claims and equivalents.

Furthermore, it is well known in the art that logic systems and methods such as described herein can include a variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative embodiment in this specification.

In some of the drawings and detailed descriptions below, the present invention is described in terms of the important independent embodiment of a system operating on a digital data network. This should not be taken to limit the invention, which, using the teachings provided herein, can be applied to other situations, such as cable television networks, wireless networks, etc. Furthermore, in some aspects, the present invention is described in terms of client/server systems. A number of computing systems and computing architectures are described in the art as client/server art. For the purposes of this description, client/server should be understood to include any architecture or configuration wherein an element acting as a client accesses a remote and/or separate program or device that is providing the desired service (e.g., a server).

All references, publications, patents, and patent applications cited herein are hereby incorporated by reference in their entirety for all purposes.

BRIEF DESCRIPTION OF THE DRAWINGS

FIG. 5 is a block diagram illustrating an example serial telephone interface and method according to specific embodiments of the present invention.

FIG. 6 is a block diagram illustrating an example email interface and method according to specific embodiments of the present invention.

FIG. 8 is a block diagram illustrating an example user modification interface and method according to specific embodiments of the present invention.

FIG. 9 is a block diagram illustrating an example initial web-based interface and method according to specific embodiments of the present invention.

FIG. 10 is a block diagram illustrating an example outlet scheduling interface and method according to specific embodiments of the present invention.

FIG. 11 is a block diagram illustrating an example outlet label and properties modification interface and method according to specific embodiments of the present invention.

FIG. 13 is a block diagram illustrating an example user interface and method according to specific embodiments of the present invention.

FIG. 14 is a block diagram illustrating an example user modification interface and method according to specific embodiments of the present invention.

FIG. 15 is a block diagram illustrating an example web-based setup interface and method according to specific embodiments of the present invention.

FIG. 16 is a block diagram illustrating an example network identification interface and method according to specific embodiments of the present invention.

FIG. 17 is a block diagram illustrating an example telephone setup interface and method according to specific embodiments of the present invention.

FIG. 18 is a block diagram illustrating an example logging setup interface and method according to specific embodiments of the present invention.

FIG. 19 is a block diagram illustrating an example date/time setup interface and method according to specific embodiments of the present invention.

FIG. 20 is a block diagram illustrating an example SNMP setup interface and method according to specific embodiments of the present invention.

FIG. 21 is a block diagram illustrating an example options setup interface and method according to specific embodiments of the present invention.

FIG. 22A-B is a diagram illustrating an example of external features and appearance of an example three connector configurable power supply according to specific embodiments of the present invention.

FIG. 23A-B is a diagram illustrating an example of external features and appearance of an example two connector power supply according to specific embodiments of the present invention.

FIG. 28A-B is a block diagram illustrating details of three current sensors of an example configurable power supply according to specific embodiments of the present invention.

FIG. 34 is a user interface for monitoring a power distribution unit according to an embodiment.

DETAILED DESCRIPTION OF THE EMBODIMENTS

Figure 1:
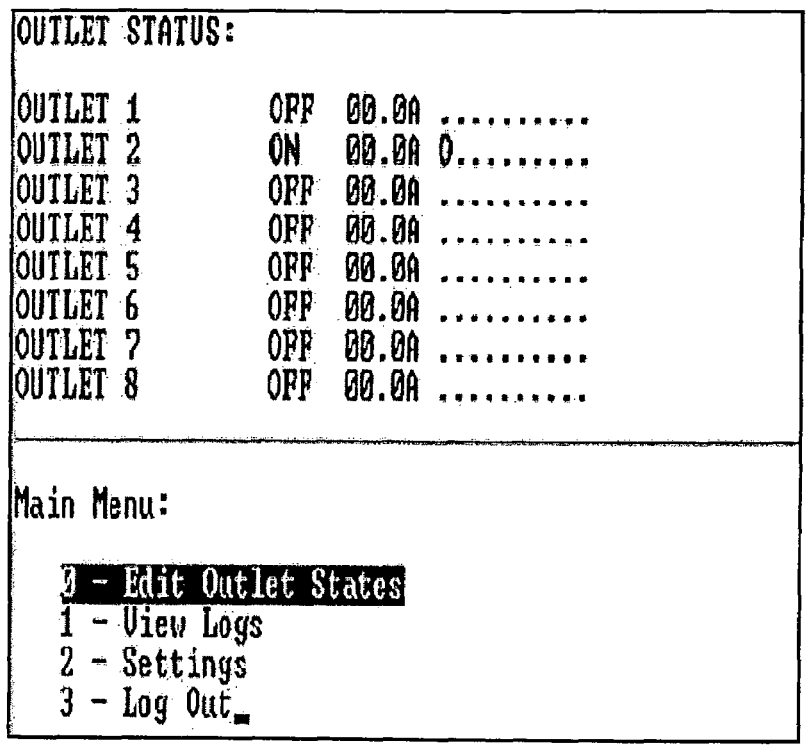
FIG. 1 is a block diagram illustrating an example initial serial interface and method according to specific embodiments of the present invention.

Various embodiments of the present invention will now be described in detail with reference to a number of drawings.

According to specific embodiments, the present invention can be embodied into an example power switch product, sometimes referred to as the SPS (Smart Power Switch)™ power controller. In specific embodiments, a device built according to specific embodiments of the invention can include three different interfaces, such as, for example, serial, telephone, network. Such embodiments may be referred to here as the TriCom™ or the Tri-n (with n indicated the number of controlled outlets provided and tri indicated the presence of three interfaces, e.g., Tri-8™). In other embodiments, a device built according to specific embodiments of the invention can include two different interfaces, such as, for example, serial/telephone or serial/network or telephone/network. Such embodiments may be referred to herein as the DualCom™ or the Dual-n (with n indicated the number of controlled outlets provided and tri indicated the presence of three interfaces.

1. Interfaces

Thus, a device according to specific embodiments of the present invention is a power distribution unit that utilizes multiple different modes of communication. In particular embodiments, an SPS can be accessed via serial, Ethernet or direct phone. These interfaces can provide either identical functionality or functionality can vary for different interfaces. For example, through the serial and Ethernet interfaces a user can determine and change the state of each outlet, determine the amount of current that each outlet is drawing, and add or modify scheduled on/off events on outlets. In specific embodiments, all of these functions can be performed in real time.

Serial Interface

According to specific embodiments of the present invention, a serial interface uses a standard serial port protocol, so that any information devices (e.g., a laptop, personal computer, or digital controller) with an available corn or com-like port can use this direct connection to the SPS. The serial port can also be used as an initial setup port for the unit. The serial interface can also be an USB-type serial interface.

[Other interfaces according to specific embodiments of the present invention are generally setup before they are used. Generally, after initialization, all the settings can be managed through the serial or Ethernet ports.

Ethernet and Network Interface

According to specific embodiments of the present invention, an Ethernet port can be utilized either through a text based Telnet session or through an HTTP web interface. The telnet session is similar to the serial interface in that its text based and the menus can generally be very similar or identical. A web interface according to specific embodiments of the invention can, for example, utilize a web browser and the Hypertext Transfer Protocol (HTTP). According to specific embodiments of the present invention, this interface looks and feels different from the others because it is a GUI (graphical user interface). An SNMP interface can be used to control various settings and retrieve various information from the SPS using a standard network management protocol, such as SNMP.

Email Interface

In addition, the SPS can be configured to email logged events. When this feature is enabled, according to specific embodiments of the present invention, a running log of events is kept and once memory is filled, the log file is sent to a designated email address. Logs can contain information such as the user name, which outlets were changed, time and date of event, and interface and or IP address used.

Telephone Interface

According to specific embodiments of the present invention, a telephone interface uses a standard analog phone line. This interface is unique in that it uses a few inexpensive parts (such as, for example, a Clare™ CPC5611 as the data access arrangement and a Sunplus™ SPC122a as the voice processor) along with a few other parts. An SPS according to specific embodiments of the present invention has DTMF (Dual Tone Multi-Frequency) decoding, caller id, and voice feedback. Once enabled and attached to a phone line, the unit is now ready to receive and process calls. The SPS can be set to accept all calls, block calls without caller ID enabled, or not accept any incoming calls. The SPS is designed so that if a user uses the phone interface he or she is greeted with a voice prompted menu. The unit will ask for a numeric pass code and then prompt the user for the next command. In specific embodiments, though the SPS has a voice prompted menu, it will only respond to (DTMF) telephone tones as commands and not to speech. In further embodiments, speech recognition can be included in a device according to the invention.

An embedded hardware arrangement along with its caller id and voice feedback capabilities according to specific embodiments of the present invention has never been utilized in the present combination in any comparable smart power switch or power distribution units. This interface is not included in all embodiments of the invention.

Interface Features and Functions

According to specific embodiments of the present invention, the serial and/or Ethernet interfaces have the ability to:
change the state of outlets
assign outlet labels
assign outlet schedule
edit and assign users
edit network, email, and phone interface settings.

A wide variety of configurations are possible according to various specific embodiments of the present invention. Some of these configurations are described herein as examples of the invention. Various configuration details are also elements in novel embodiments of the invention.

According to specific embodiments of the present invention, different features may be accessible from different interfaces. Table 1 below provides an example feature set indicating particular interfaces according to specific embodiments of the present invention.

TABLE 1

|  | TCP/IP-WEB | TCP/IP-TELNET | TCP/IP-SNMP | SERIAL | PHONE |
|---|---|---|---|---|---|
| Switch outlets on and off | ● | ● | ● | ● | ● |
| Monitor outlet on/off status | ● | ● | ● | ● | ● |
| Monitor current consumption of each outlet | ● | ● | ● | ● |  |
| Program outlet schedules | ● |  | ● |  |  |
| Protect with Password/PIN security | ● | ● | ● | ● | ● |
| Control outlet access with users and passwords | ● | ● | ● | ● |  |
| Manage users | ● | ● | ● | ● |  |
| Control multiple units from a single |  |  | ● |  |  |

Per Outlet Current Monitoring

According to specific embodiments of the invention, the invention provides per-outlet current monitoring for a plurality of controlled outlets. In particular embodiments, this novel feature is integrated into the user interfaces as provided herein. Per-outlet current monitoring according to specific embodiments of the invention provides a mechanism of remotely managing current load on a individual device basis.

User-Controllable Scheduling

According to specific embodiments of the invention, the invention features user-controllable scheduling of each outlet. While other power devices have provided various staged power up operation, the present invention allows a user to flexible manage scheduling features.

Detailed Interface Examples and Operation

Many different particular arrangements of menus and functions are possible according to specific embodiments of the invention. In order to provide a complete description of example methods of operation according to specific embodiments of the invention, the following describes specific example menus and methods of one or more systems according to the invention.

Example Serial Connection Interfaces

In specific embodiments, the invention includes a set of interfaces for a direct serial connection. The discussion below and the referenced figures provide specific example embodiments of such interfaces.

Initialize

FIG. 1 provides an example of an initial serial interface screen. An example configuration and method of this screen is as follows. Using an appropriate serial cable attached between an SPS according to specific embodiments of the invention and an information screen, such as a terminal or PC, start a Hyper Terminal type session. For example, a connection can be made to COM 1 with the settings: 19200 bit rate, 8 data bits, parity=none, stop bits=1, and Flow control=none.

Once connected, log on with a user name and password. Once logged in type 0 for editing outlet states, 1 to view logs or 2 to edit settings.

Edit Settings

Figure 2:
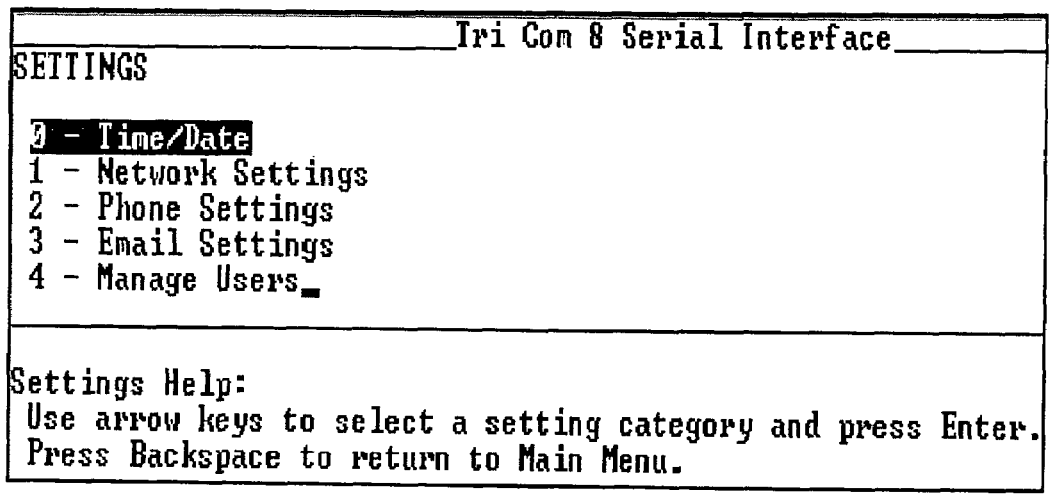
FIG. 2 is a block diagram illustrating an example serial settings interface and method according to specific embodiments of the present invention.

FIG. 2 provides an example settings menu according to specific embodiments of the invention. In the settings menu a user can set such things as Time/Date, Network Settings, E-mail Settings, and Manage Users. For example, to edit a category a user can use arrow keys or a mouse to select the category or type a corresponding number or letter for the listed function. Note, in a Dual-Com, for example, either the network settings or phone settings may not be present.

Settings Time/Date

Figure 3:
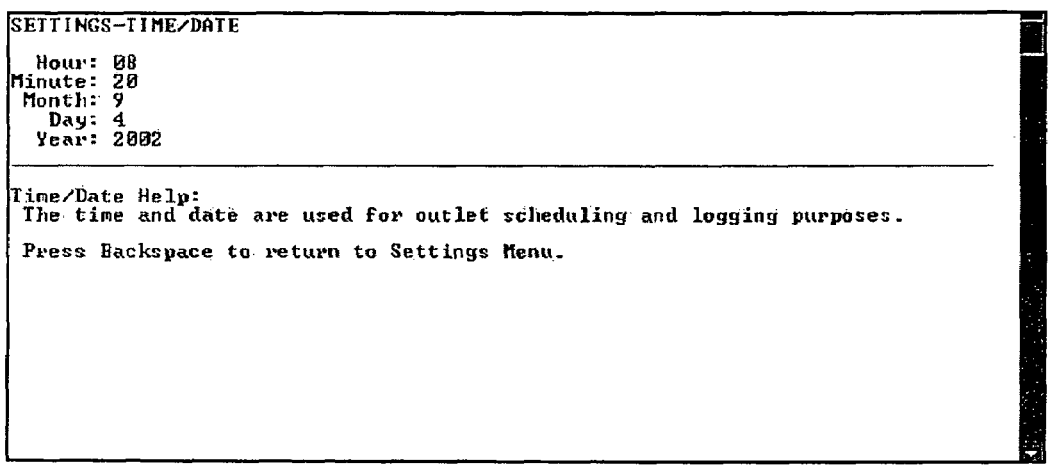
FIG. 3 is a block diagram illustrating an example serial time/date interface and method according to specific embodiments of the present invention.

FIG. 3 provides an example time/date settings menu according to specific embodiments of the invention. This interface can be used by, for example, scrolling to the proper heading and pressing enter to change a value and once the values have been changed press enter to finalize.

Settings Network

Figure 4:
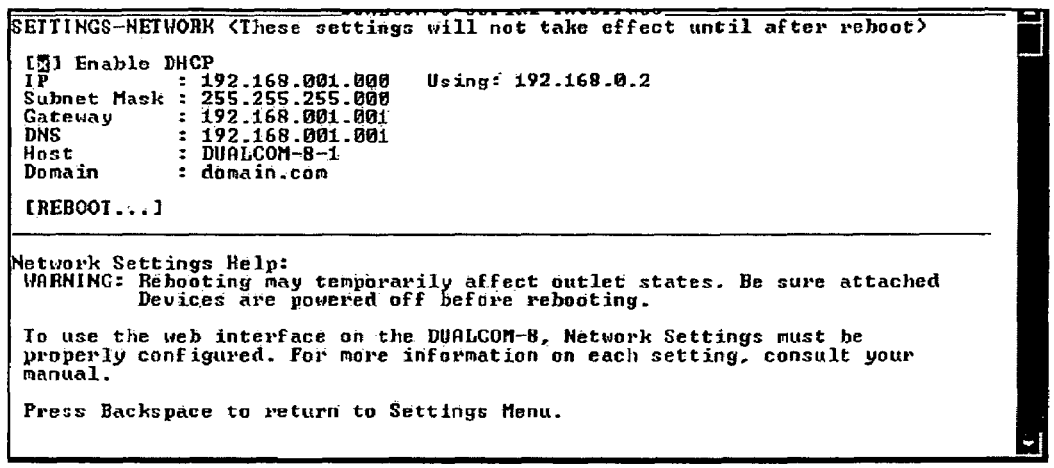
FIG. 4 is a block diagram illustrating an example serial network interface and method according to specific embodiments of the present invention.

FIG. 4 provides an example network settings menu according to specific embodiments of the invention. This interface can be used by, for example, scrolling to the proper heading and pressing enter to change a value and once the values have been changed press enter to finalize. This procedure may be repeated for all network settings. Network settings can include such things as values for IP addressing, host and/or domain names, enablement of DHCP (Dynamic Host Configuration Protocol), SNMP, or other functions, etc. In specific embodiments, once all network settings have been made the Tricom must be rebooted in order for the new settings to take affect.

According to specific embodiments of the invention, seven settings are provided here: Enable DHCP (This is set to on as default so that if there is a DHCP server the SPS will get it's IP address from it. If so it will show up under the Using: section and it will be different than 192.168.1.2 [the default if no DHCP Server is found]); IP; Subnet Mask; DNS; Gateway; Host; and Domain.

Settings Telephone

FIG. 5 provides an example telephone settings menu according to specific embodiments of the invention. This interface can be used by, for example, scrolling to the proper heading and pressing enter to change a value. Telephone settings can include such things as values for a phone personal identification number (PIN) and/or enablement of various telephone functions. In embodiments without a telephone interface, this menu may not be available.

Settings Email

FIG. 6 provides an example email settings menu according to specific embodiments of the invention. This interface can be used by, for example, scrolling to the proper heading and pressing enter to change a value. Email settings can include such things as values for a email address and/or server and/or email heading values and/or and/or enablement of various email functions. In embodiments without an email interface, this menu may not be available.

Settings Users

Figure 7:
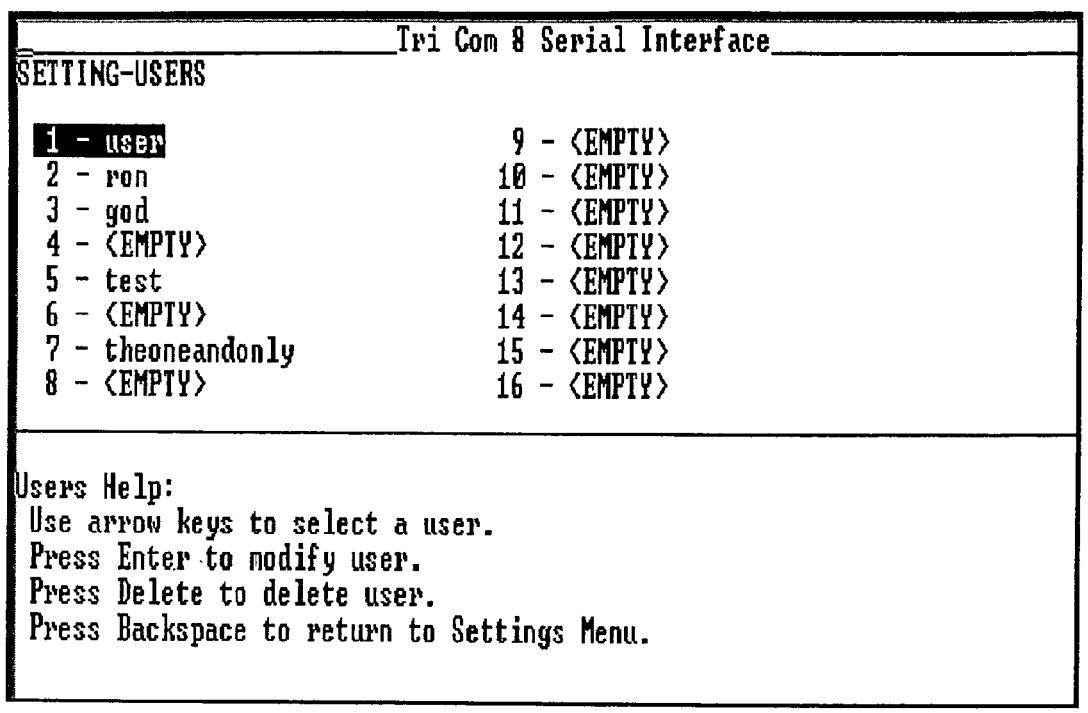
FIG. 7 is a block diagram illustrating an example user settings interface and method according to specific embodiments of the present invention.

FIG. 7 provides an example initial user settings menu and FIG. 8 provides an example user modification settings menu according to specific embodiments of the invention. This interface can be used by, for example, scrolling to the proper heading and pressing enter to change a value. User settings can include such things as user names, passwords, administrator indications, permissions. Permissions can include individual outlet modification permissions.

Example Web Connection Interfaces

In specific embodiments, the invention includes a set of interfaces for a web-based connection. The discussion below and the referenced figures provide specific example embodiments of such interfaces. Once a network port (such as Ethernet) has been configured with the proper addressing, a user can access a SPS according to specific embodiments of the present invention through such things as a telnet session or through a web browser. According to specific embodiments of the invention, the Telnet session is text based and menu driven and has the same look and feel as the serial connection described above. A web interface is optimized for use in all web browsers, such as Internet Explorer.

To begin using the web interface, start a web browser and input an SPS's network identification (e.g., an IP and/or domain name address) Once found, an example SPS can prompt for a log on, for example using a popup window requesting a user name and password or alternatively, by retrieving saved passwords.

FIG. 9 provides an example of web-based interface screen according to specific embodiments of the invention. This example figure shows a number of different possible functionalities according to specific embodiments of the invention.

For example, the four underlined links at the top of the interface can have the following functions:

OUTLETS: change the state of outlets, setup scheduling, rename outlets and view current draw (e.g., amperage) per outlet.

LOGS: shows previous events (e.g., the last 30) that have occurred.

USERS: add, edit and delete users to the unit

SETUP: network, time/date and preference settings. Generally, only users with administrator privileges can access the setup and users tabs.

According to specific embodiments of the invention, outlet management can be handled as follows. To change the state of any outlet simply click the outlet indication on or off. A round indicator button can provide a color indication of outlet status, e.g., green indicating that the outlet is on and white indicating that the outlet is off. To rename an outlet, click on a label given to the outlet, e.g., "Com Server 2" and in either a popup box or the link enter the new name then click Save Label. Generally, according to specific embodiments of the invention, unless a user is an administrator, the user's selection of outlets is limited to what your administrator has assigned. Common users also have no access to logs, users, and setup.

According to specific embodiments of the invention, scheduling for individual outlets can be performed as follows. To set a scheduled task select, for example, a clock icon that corresponds to the outlet for which it is desired to set the schedule. FIG. 10 is a block diagram illustrating an example outlet scheduling interface and method according to specific embodiments of the present invention. Once the outlet is selected, add events by for example changing time, day and then clicking on the Add Event button. Before clicking the Save Schedule Options button, click in the box that indicates scheduling is enabled for this outlet.

FIG. 11 is a block diagram illustrating an example outlet label and properties modification interface and method according to specific embodiments of the present invention. This interface can be used to change outlet labels and adjust other outlet properties.

Figure 12:
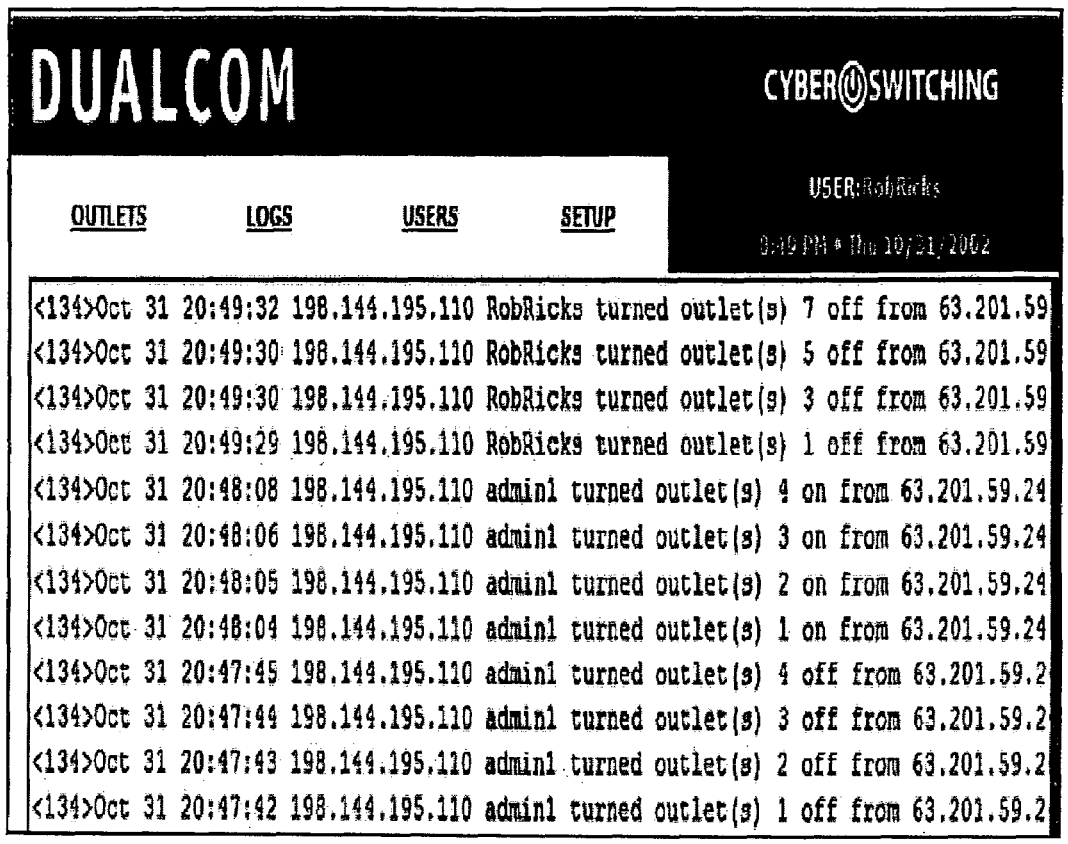
FIG. 12 is a block diagram illustrating an example logging interface and method according to specific embodiments of the present invention.

FIG. 12 is a block diagram illustrating an example logging interface and method according to specific embodiments of the present invention. According to specific embodiments of the invention, an SPS keeps a running log of events which, if enabled, can be e-mailed to a designated person. For example, in specific embodiments, once the log file is filled the log is then e-mailed and the memory buffer is then cleared and refreshed. If not setup to E-mail, the unit will then overwrite the oldest event, keeping the log current. Logs may generally also be sent or cleared manually be clicking an appropriate heading that can be provided in specific embodiments.

FIG. 13 is a block diagram illustrating an example user interface and method according to specific embodiments of the present invention. To access the users tab generally a user has to be an administrator. To add or edit an existing user click edit in the row desired. In the popup box enter a user name, password and select the outlets the new user will be able to access. Once the information is complete click the Save User button and the user may now log in. To completely remove a user, indicate delete. FIG. 14 is a block diagram illustrating an example user modification interface and method according to specific embodiments of the present invention.

FIG. 15 is a block diagram illustrating an example web-based setup interface and method according to specific embodiments of the present invention. This interface provides information about such things as time/date, network settings, logging settings, SNMP settings, can also provide information about telephone settings in an SPS with a telephone interface. Generally, this interface is only accessible to administrators. To make changes using this interface, use the edit button that corresponds to the appropriate heading. For example, to set TIME/DATE, click the corresponding edit button, make the proper changes then click Save.

FIG. 16 is a block diagram illustrating an example network identification interface and method according to specific embodiments of the present invention. This interface can, for example, be provided as a popup box from the overall settings interface. In this interface, enter the IP address to assign to the unit. Enter the units Subnet Mask, DNS, host, and domain name. Once all fields are filled in, click the Save and Reboot button. Generally, network settings will not take affect until the unit has been rebooted.

FIG. 17 is a block diagram illustrating an example telephone setup interface and method according to specific embodiments of the present invention. To setup the telephone interface, click on the corresponding edit button. By placing a check mark in the "enable interface" box, all calls will be processed by the Tricom. However, if there is no check mark at "Allow callers with no caller ID" the unit will then only answer calls with a caller ID tag and reject all others.

In SPS units with a telephone interface, enabled as described above, the physical interface according to specific embodiments of the present invention can be connected using a standard analog phone line to the phone jack on the front panel of the SPS. Once connected to an analog phone line and the interface is enabled, the SPS can now be reached and controlled independently from a network or a computer. From an office desk phone to a private cell phone, there is a truly remote means of control. The SPS can be configured to block calls from restricted or unavailable phones. The phone number of the telephone from which a user is calling from must be received by the SPS in order to access the main menu. According to specific embodiments of the present invention, a system can be configured to "Allow callers with no caller ID," though due to security reasons this is not recommended.

FIG. 18 is a block diagram illustrating an example logging setup interface and method according to specific embodiments of the present invention. Under the Logging heading administrators can setup E-mail properties and server settings. To enable the E-mail logs feature click the corresponding edit button. In the popup box, enter the SMTP server name as well as the E-mail address of the person to receive the logs. The "From" and "Subject" boxes are not required to send the log. Once all entries and the "Dump logs to E-mail . . . " box is checked, click the save button. The unit is now ready to send the log once the buffer is full. According to specific embodiments of the present invention, the SMTP server acts as an outgoing E-mail server. If you don't have this information please consult your network administrator. With out the proper SMTP server, the unit will not be able to E-mail out the logs regardless of all the other settings.

FIG. 19 is a block diagram illustrating an example date/time setup interface and method according to specific embodiments of the present invention. To configure the NTP (Network Time Protocol) settings with an NTP Server addressing delete the default settings and ensure that there is a check in the "Enable NTP" checkbox. Once settings are entered a user can indicate "Save" and the page will refresh with the new time/date that the SPS received from the local NTP servers. To manually set "Time/Date" uncheck the "Enable NTP" check box, though it is highly recommended to use an NTP server.

FIG. 20 is a block diagram illustrating an example SNMP setup interface and method according to specific embodiments of the present invention. SNMP is by default set to enabled which may cause a security risk. It is therefore suggested to set this to disabled if not used. The MIB (Management Information Block) listing below provides additional information about a specific example SNMP interface according to specific embodiments of the present invention.

FIG. 21 is a block diagram illustrating an example options setup interface and method according to specific embodiments of the present invention. This interface can be provided to change behavioral settings such as refresh rates and outlet change confirmations. To avoid accidental on/offs, require confirmation for each on/off event on the web by placing a check in the Require confirmation box. With this feature enabled users will have to click on or off then OK or cancel for each outlet change. The Refresh rate is user definable from 1-999 seconds. Once set the Outlets page will now refresh to the specified time. If the refresh rate is set too fast, the system may not have enough time to load the entire page. Regardless of the refresh rate setting the network speed will determine how fast a page is loaded. A default example setting is at 10 seconds.

Software Implementations

Thus, in further embodiments, the present invention may be understood in the context of providing power management over a communication media. An important application for the present invention, and an independent embodiment, is in the field of providing power cycling and monitoring over the Internet, optionally using Internet media protocols and formats, such as HTTP, RTTP (Real-Time Transport Protocol), XML (eXtensible Markup Language), HTML, dHTML (Dynamic Hyper Text Markup Language), VRML (Virtual Reality Markup Language), as well as image, audio, or video formats etc. However, using the teachings provided herein, it will be understood by those of skill in the art that the methods and apparatus of the present invention could be advantageously used in other related situations where users access content over a communication channel, such as modem access systems, institution network systems, wireless systems, etc.

Various embodiments of the present invention provide methods and/or systems for power management and/or monitoring that can be implemented on a general purpose or special purpose information handling appliance using a suitable programming language such as Java, C++, Cobol, C, Pascal, Fortran, PL1, LISP, assembly, etc., and any suitable data or formatting specifications, such as HTML, XML, dHTML, TIFF, JPEG, tab-delimited text, binary, etc. In the interest of clarity, not all features of an actual implementation are described in this specification. It will be understood that in the development of any such actual implementation (as in any software development project), numerous implementation-specific decisions must be made to achieve the developers' specific goals and subgoals, such as compliance with system-related and/or business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

As will be further understood from the teachings provided herein, the present invention encompasses a variety of specific embodiments for performing these steps. As further described below, request for power management and monitoring information may be received in a variety of ways, including through one or more graphical user interfaces provided by an SPS to the client system or by the SPS system receiving an email or other digital message or communication from the client system. Thus, according to specific embodiments of the present invention, data and/or indications can be transmitted to the SPS using any method for transmitting digital data, including HTML communications, FTP communications, email communications, wireless communications, etc. In various embodiments, indications of desired data can be received from a human user selecting from a graphical interface at a computing device.

Example External Hardware System Configuration

Figures 22A, 22B:
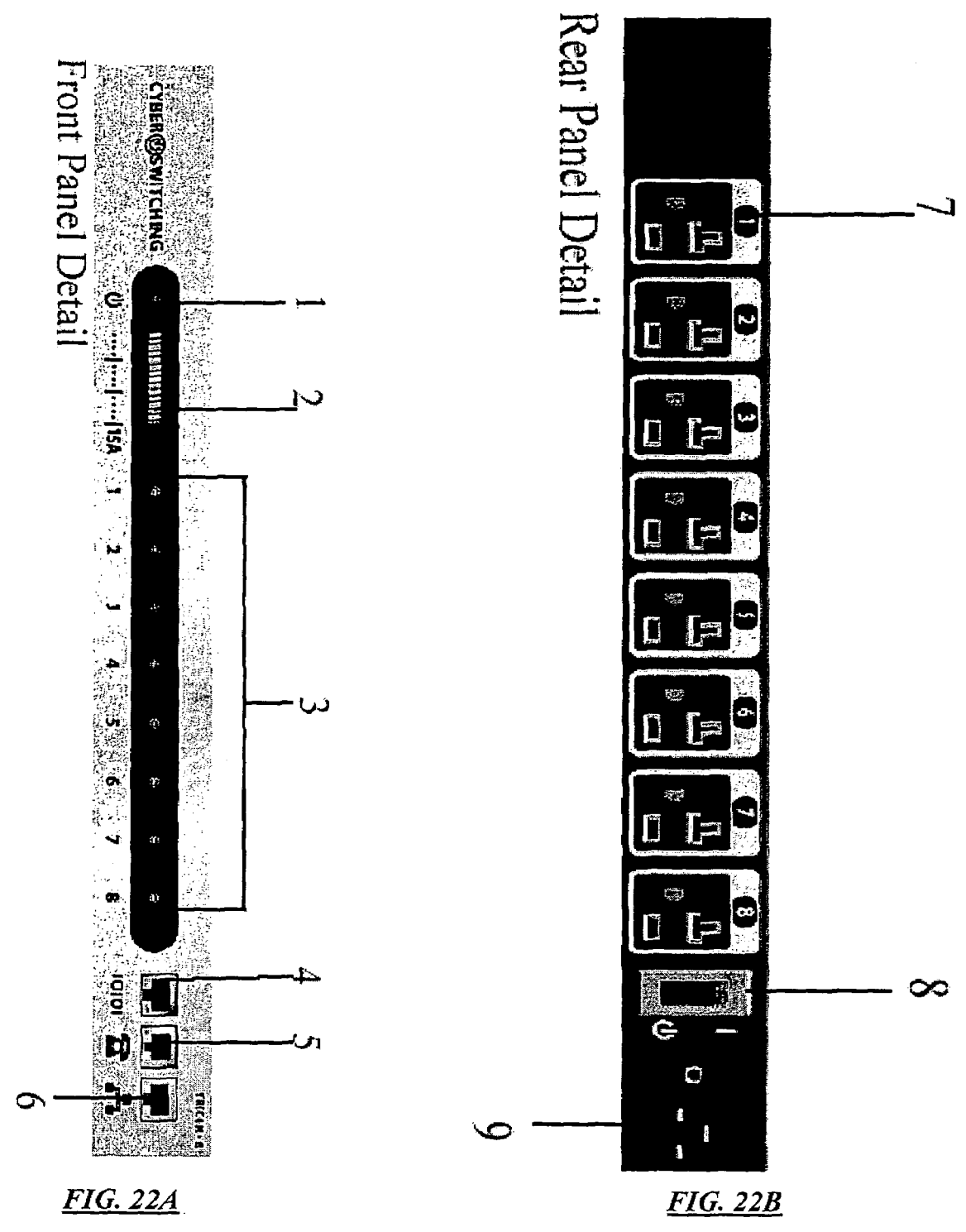

FIG. 22A-B is a diagram illustrating an example of external features and appearance of an example three connector configurable power supply according to specific embodiments of the present invention. The figures illustrate the following example elements:

1: Unit power indicator
2: Over-all amperage usage meter
3: Outlet indicator
4: Serial port
5: Direct phone line connection (not a modem port)
6: Ethernet port
7: AC outlets
8: Outlets on/standby switch
9: AC inlet receptacle FIG. 23A-B is a diagram illustrating an example of external features and appearance of an example two connector power supply according to specific embodiments of the present invention. In this example embodiment, the phone interface and outlets on/standby switch are not provided on the panels shown.

According to specific embodiments of the invention, an SPS is designed to be mounted into a standard, 19 inch, network rack or cabinet. If mounted in the horizontal position the SPS takes up 1 rack unit of space. While many other dimensions are possible, in specific embodiments, the invention provides the described functionality in a system having total dimensions less than about a 1RU for 19" rack, or 17" wide×8.38" deep×1.75" high.

Including the functionalities described herein in a design having the appearance and dimensions indicated above is considered a further novel and beneficial feature of the invention, various modifications of this basic design are encompassed by the broad descriptions of the invention according to specific embodiments. As just one example, designs can have various desired numbers of controlled outlets, such as 1, 2, 3, 4, 8, 16, 24 and be provided in different dimensions. As a further example, one or more of the controlled power outlets can be controlled together, such as a system providing four pairs of power outlets. As a further example, the outlet shapes shown above can be varied, for example for connecting to different power systems, including various international power systems and different voltages. The design elements illustrated can also be varied.

Example Hardware Functional Components

Figure 24:
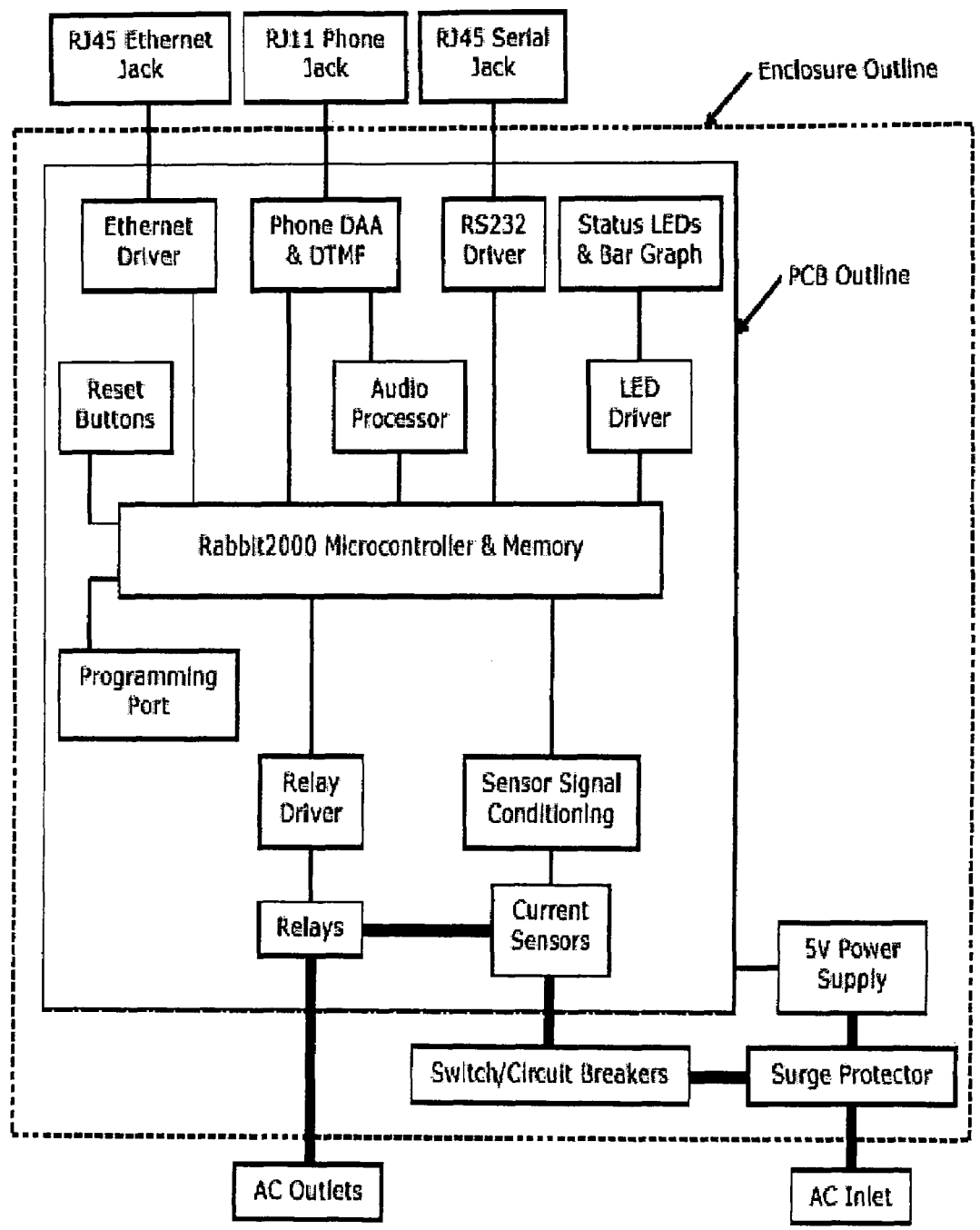
FIG. 24 is a block diagram illustrating an example logic modules of a configurable power supply according to specific embodiments of the present invention.

FIG. 24 is a block diagram illustrating an example logic modules of a configurable power supply according to specific embodiments of the present invention. This is one example embodiment showing a number of different elements in one or more novel arrangements not of all which will be a part of all embodiments.

In this example embodiment, various functions as described above are provided by a microprocessor executing a stored-program, such as, for example, a Rabbit2000 Microcontroller and Memory. According to specific embodiments of the invention, the microcontroller provides the logical execution ability to both control the outlets using a relay driver and relays as shown and also to provide communications ability through two or more interfaces, such as an Ethernet interface comprising an Ethernet connector (jack) and driver, a phone interface comprising a phone connector (jack) and phone DAA (Data Access Arrangement) & DTMF along with an audio processor for generating audio status indications and/or for recognizing speech commands, a serial interface comprising a serial connector (e.g., a RJ45 serial jack and/or a USB connection) and appropriate drivers, and an external LED interface comprising one or more LEDs and an LED driver.

According to specific embodiments of the invention, current sensors are provided for each outlet and a sensor signal conditioning module and/or function provides information to the microcontroller for use in reporting current status and/or also for use in providing current control. A surge protector, switch/circuit breaker, and digital operating voltage power supply (e.g., 5 volts or 3.3 volts, etc.) are also included.

Any number of different brands of available modules can be used in specific embodiments of the invention.

Portions of an Example Circuit Description

FIG. 25 through FIG. 28 provide selected details of an example system according to specific embodiments of the invention. These figures include component listings and circuit descriptions that will be familiar in the art. For clarity of disclosure, these figures do not include every detail of every element of an example system, but do show example embodiments of salient features of an SPS according to specific embodiments of the invention.

Figure 25A:
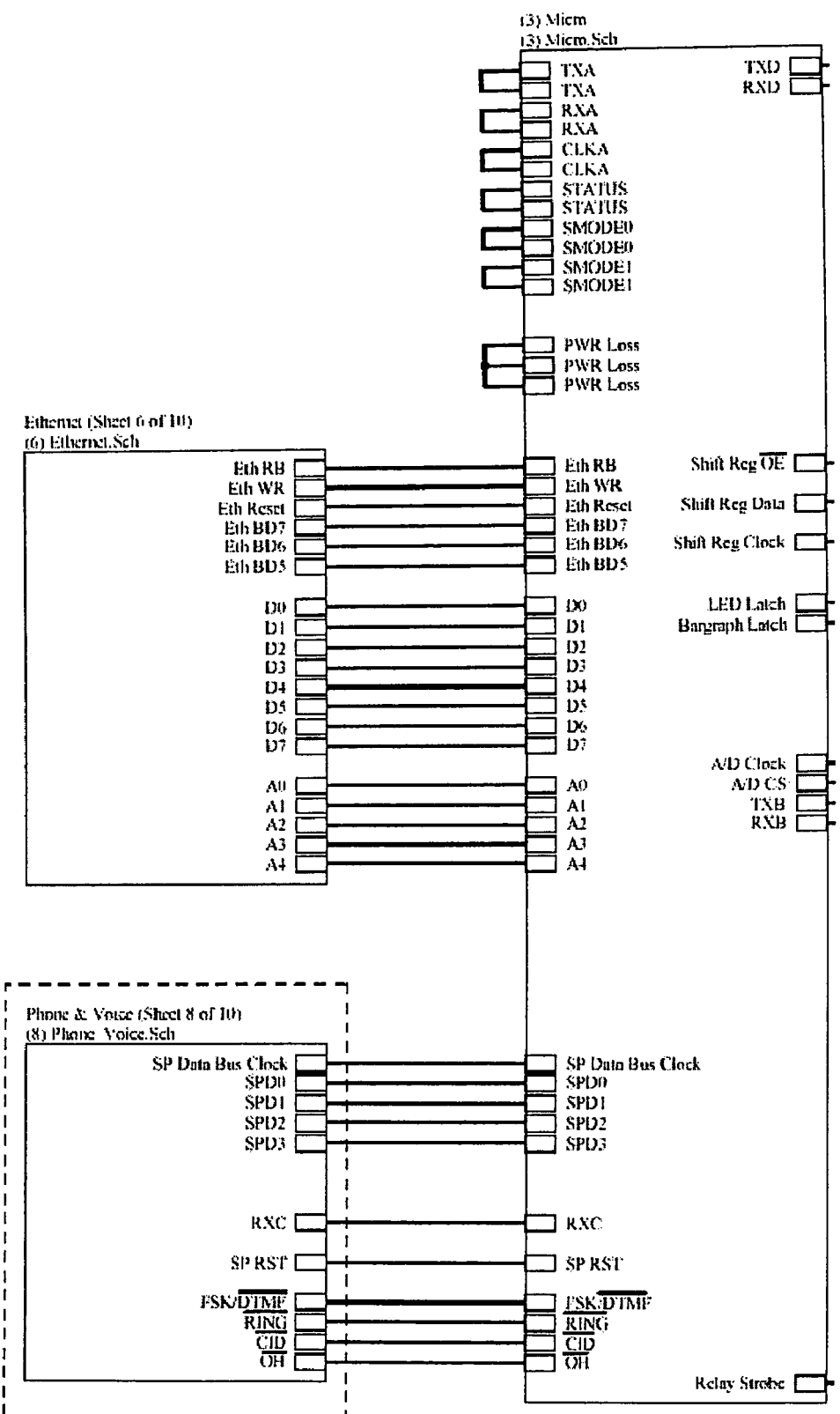
FIG. 25A-B is a block diagram illustrating in further details major functional components of an example configurable power supply according to specific embodiments of the present invention.
Figure 25B:
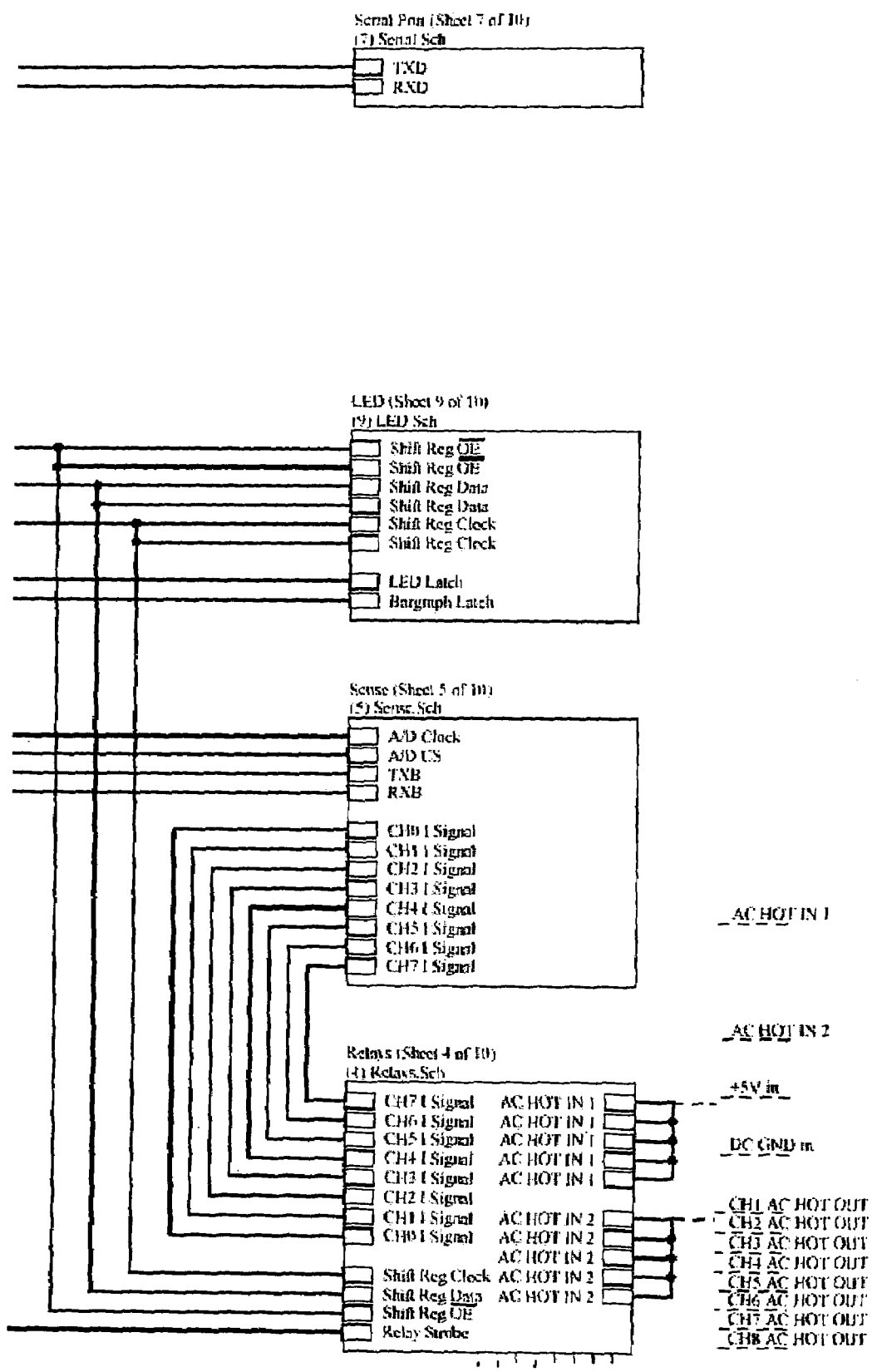

FIG. 25A-B is a block diagram illustrating in further details major functional components of an example configurable power supply according to specific embodiments of the present invention. In this embodiment, a microcontroller as shown in the center of the figure is connected to functional components of the invention including an Ethernet module, a Phone & Voice module, a Serial Port module, an LED module, a current Sense module, and a Relays module. The Ethernet module, Phone & Voice module, Serial Port module, and LED module can represent standard configurations of known circuit elements that are not further described herein. The Ethernet module, for example, can consist primarily of an RTL8019AS Ethernet integrated circuit or similar off-the-shelf circuits or custom or integrated components. The Serial Port module, for example, can consist primarily of an SP232E integrated circuit or similar off-the-shelf circuits or custom or integrated components. The Phone & Voice module, for example, can consist primarily of available components such as a CLARE-CPC5620, a SUNPLUS-SPC122ABOARD and/or a NPC-SM8223A integrated circuits or similar off-the-shelf circuits or custom or integrated components. An LED and bar-graph display can be provided using components such as an ALLEGRO 6275 and/or an ALLEGRO 6276 or similar off-the-shelf circuits or custom or integrated components.

Figure 26:
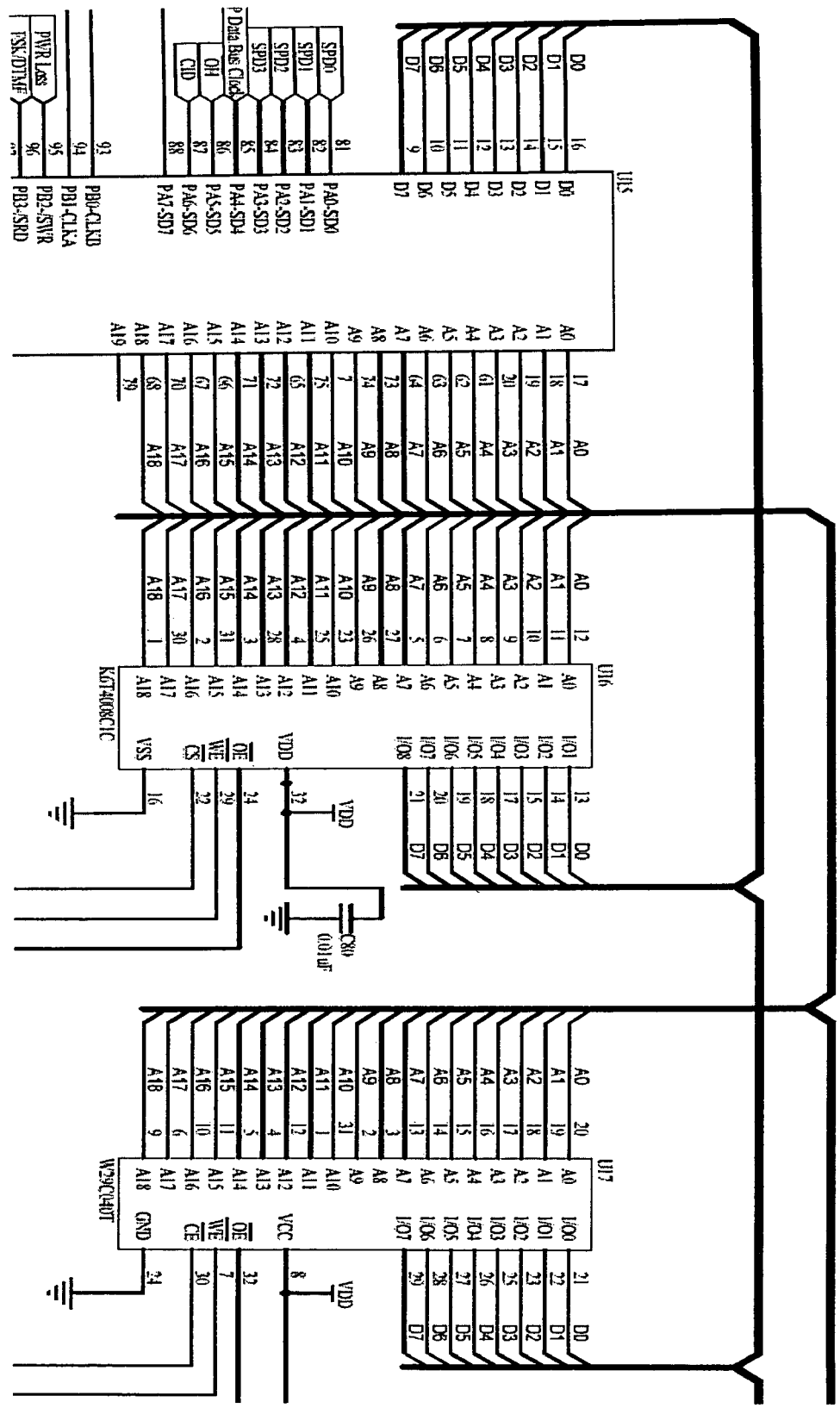
FIG. 26 is a block diagram illustrating details a microcontroller and other control logic of an example configurable power supply according to specific embodiments of the present invention.

FIG. 26 is a block diagram illustrating details of a microcontroller and other control logic of an example configurable power supply according to specific embodiments of the present invention. In this embodiment, a RABBIT 2000 microcontroller is shown with an SRAM memory and CMOS FLASH MEMORY.

Figure 27:
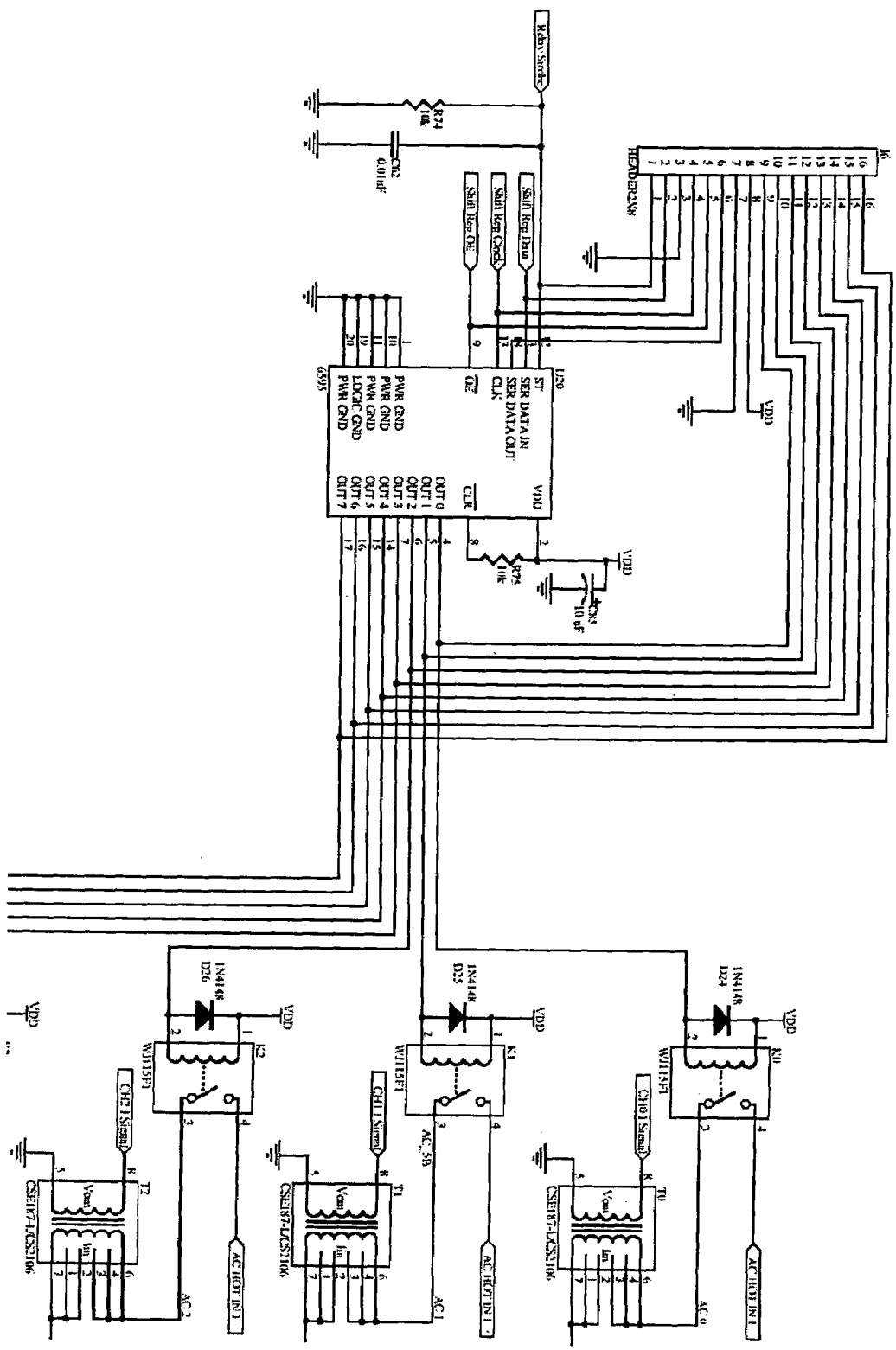
FIG. 27 is a block diagram illustrating details of three power relays of an example configurable power supply according to specific embodiments of the present invention.

FIG. 27 is a block diagram illustrating details of three power relays of an example configurable power supply according to specific embodiments of the present invention. According to specific embodiments of the invention, the number of power relays will correspond to the number of managed power outlets, such as eight. In alternative embodiments, each relay may provided on-off management of multiple grouped power outlets.

Figure 28B:
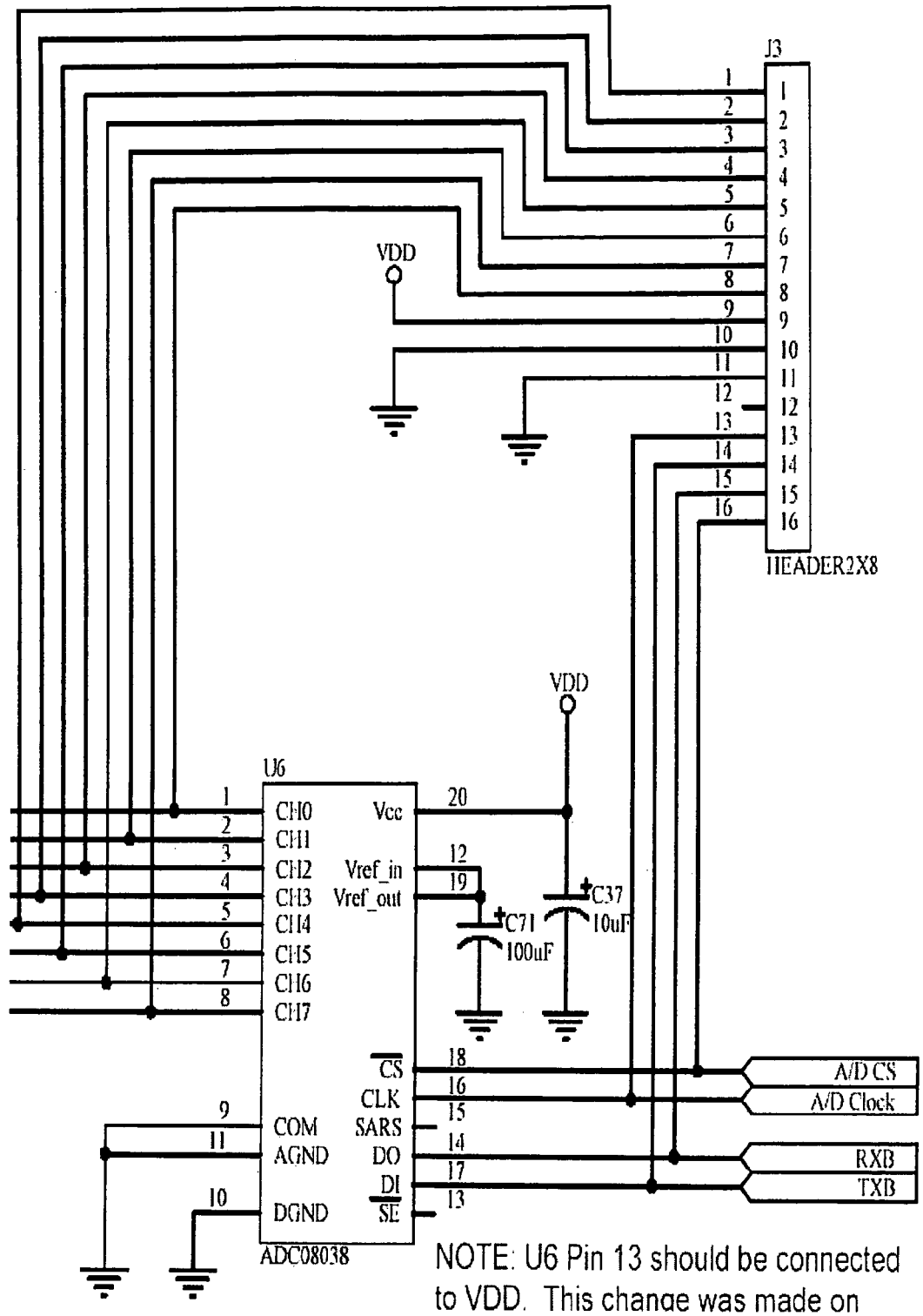

FIG. 28A-B is a block diagram illustrating details of three current sensors of an example configurable power supply according to specific embodiments of the present invention. According to specific embodiments of the invention, the number of sensors will correspond to the number of managed power outlets, such as eight. In alternative embodiments, each sensor relay may provided sensing of multiple grouped power outlets.

Example SNMP MIB

As is known in the art, SNMP operates using data structures known as MIBs. Provided below is one example MIB that provides further details of a specific embodiment of the invention.

```
CYBERSWITCHING-MIB DEFINITIONS ::= BEGIN
IMPORTS
        enterprises, IpAddress,
        TimeTicks, Counter, Gauge, Opaque FROM RFC1155-SMI
        OBJECT-TYPE FROM RFC-1212
        TRAP-TYPE FROM RFC-1215
        DisplayString FROM RFC1213-MIB;
--
--      Copyright (C) 2003, CyberSwitching. All rights reserved.
cyberswitching              OBJECT IDENTIFIER ::= { enterprises 14300 }
cyberswitching-products    OBJECT IDENTIFIER ::= { cyberswitching 1 }
-- ========== CyberSwitching NMS products ==========
tricom-8                    OBJECT IDENTIFIER ::= { cyberswitching-products 1 }
tricom-8-ctrl               OBJECT IDENTIFIER ::= { tricom-8 1 }
tricom-8-mgmt               OBJECT IDENTIFIER ::= { tricom-8 2 }
tricom-8-traps              OBJECT IDENTIFIER ::= { tricom-8 3 }
oNumber OBJECT-TYPE
    SYNTAX   INTEGER
    ACCESS   read-only
    STATUS   mandatory
    DESCRIPTION
        "The number of managed outlets present on this system."
    ::= { tricom-8-ctrl 1 }
oTable OBJECT-TYPE
    SYNTAX   SEQUENCE OF OEntry
    ACCESS   not-accessible
    STATUS   mandatory
    DESCRIPTION
        "A list of outlet entries. The number of
        entries is given by the value of oNumber."
    ::= { tricom-8-ctrl 2 }
oEntry OBJECT-TYPE
```

```
    SYNTAX   OEntry
    ACCESS   not-accessible
    STATUS   mandatory
    DESCRIPTION
        "An outlet entry containing STATUS   and properties
        of a managed outlet."
    INDEX    { oIndex }
    ::= { oTable 1 }
OEntry ::=
    SEQUENCE {
        oIndex
            INTEGER,
        oLabel
            DisplayString,
        oState
            INTEGER,
        oCurrentStr
            DisplayString,
        oCurrentFloat
            Opaque,
        oCurrentInt
            INTEGER
    }
oIndex OBJECT-TYPE
    SYNTAX   INTEGER (1..8)
    ACCESS   read-only
    STATUS   mandatory
    DESCRIPTION
        "A unique value for each outlet. Its value
        ranges between 1 and the value of oNumber."
    ::= { oEntry 1 }
oLabel OBJECT-TYPE
    SYNTAX   DisplayString (SIZE (0..15))
    ACCESS   read-write
    STATUS   mandatory
    DESCRIPTION
        "A textual string containing the outlet's
        user-friendly name."
    ::= { oEntry 2 }
oState OBJECT-TYPE
    SYNTAX   INTEGER {
            off(1),    -- outlet is on
            on(2),     -- outlet is off
            error(3)   -- outlet has a problem
        }
    ACCESS   read-write
    STATUS   mandatory
    DESCRIPTION
        "The outlet's state. (ON/OFF/ERROR). Reading oState
        returns the outlet's state. Setting oState to off
        turns the outlet off. Setting oState to on turns the
        outlet on. Setting oState to error is invalid."
    ::= { oEntry 3 }
oCurrentStr OBJECT-TYPE
    SYNTAX   DisplayString
    ACCESS   read-only
    STATUS   mandatory
    DESCRIPTION
        "The amount of current the outlet is drawing, string
        formatted."
    ::= { oEntry 4 }
oCurrentFloat OBJECT-TYPE
    SYNTAX   Opaque
    ACCESS   read-only
    STATUS   mandatory
    DESCRIPTION
        "The amount of current the outlet is drawing, in Amps."
    ::= { oEntry 5 }
oCurrentInt OBJECT-TYPE
    SYNTAX   INTEGER
    ACCESS   read-only
    STATUS   mandatory
    DESCRIPTION
        "The amount of current the outlet is drawing, in Amps
        This is rounded to an integer for applications that can't
        handle strings or floats."
    ::= { oEntry 6 }
oTotCurrentFloat OBJECT-TYPE
    SYNTAX   Opaque
```

```
        ACCESS    read-only
        STATUS    mandatory
        DESCRIPTION
                "The total amount of current the unit is supplying, in Amps."
        ::= { tricom-8-ctrl 3 }
oTotCurrentStr OBJECT-TYPE
        SYNTAX    DisplayString
        ACCESS    read-only
        STATUS    mandatory
        DESCRIPTION
                "The total amount of current the unit is supplying.
                (String Formatted)"
        ::= { tricom-8-ctrl 4 }
oTotCurrentInt OBJECT-TYPE
        SYNTAX    INTEGER
        ACCESS    read-only
        STATUS    mandatory
        DESCRIPTION
                "The total amount of current the unit is supplying, in Amps.
                This is rounded to an integer for applications that can't
                handle strings or floats."
        ::= { tricom-8-ctrl 5 }
oStateMask OBJECT-TYPE
        SYNTAX    INTEGER
        ACCESS    read-only
        STATUS    mandatory
        DESCRIPTION
                "Bits 0-8 = the state of all eight outlets. 0 is off
                1 is on."
        ::= { tricom-8-ctrl 6 }
triSysTimeDate OBJECT-TYPE
        SYNTAX    TimeTicks
        ACCESS    read-write
        STATUS    mandatory
        DESCRIPTION
                "Time in hundredths of a second since Jan. 1, 1980."
        ::= { tricom-8-mgmt 1 }
triTimeZone OBJECT-TYPE
        SYNTAX    INTEGER (-13..13)
        ACCESS    read-write
        STATUS    mandatory
        DESCRIPTION
                "Time zone as an offset from GMT"
        ::= { tricom-8-mgmt 2 }
triDaylightSavings OBJECT-TYPE
        SYNTAX    INTEGER {
                disabled(1),    -- Time is in standard time.
                enabled(2)      -- Time is in daylight savings time.
                }
        ACCESS    read-write
        STATUS    mandatory
        DESCRIPTION
                "When enabled, the clock is adjusted for daylight savings."
        ::= { tricom-8-mgmt 3 }
triNTPEnabled OBJECT-TYPE
        SYNTAX    INTEGER {
                disabled(1),    -- NTP is disabled. Time must be set manually.
                enabled(2)      -- NTP is enabled. Unit will attempt to get network time.
                }
        ACCESS    read-write
        STATUS    mandatory
        DESCRIPTION
                "When enabled, the unit will attempt to set its clock from the
                network using NTP servers 1 & 2."
        ::= { tricom-8-mgmt 4 }
triNTPServer1 OBJECT-TYPE
        SYNTAX    DisplayString (SIZE (0..59))
        ACCESS    read-write
        STATUS    mandatory
        DESCRIPTION
                "Time server #1. Set to 255.255.255.255 to broadcast time requests."
        ::= { tricom-8-mgmt 5 }
triNTPServer2 OBJECT-TYPE
        SYNTAX    DisplayString (SIZE (0..59))
        ACCESS    read-write
        STATUS    mandatory
        DESCRIPTION
                "Time server #2. Will be used if Timer Server #1 fails.
                Set to 255.255.255.255 to broadcast time requests."
```

-continued

```
        ::= { tricom-8-mgmt 6 }
triDHCPEnabled OBJECT-TYPE
    SYNTAX   INTEGER {
            disabled(1),   -- DHCP is disabled. Network Settings must be set manually.
            enabled(2)     -- DHCP is enabled. Unit will attempt to get settings from
DHCP server.
            }
    ACCESS   read-write
    STATUS   mandatory
    DESCRIPTION
            "When enabled, the unit will attempt to get its network settings from a DHCP
            server upon booting. If this fails, it will revert to the manual settings."
        ::= { tricom-8-mgmt 7 }
triNetworkIP OBJECT-TYPE
    SYNTAX   IpAddress
    ACCESS   read-write
    STATUS   mandatory
    DESCRIPTION
            "IP of this TRICOM-8 Unit."
        ::= { tricom-8-mgmt 8 }
triSubnetMask OBJECT-TYPE
    SYNTAX   IpAddress
    ACCESS   read-write
    STATUS   mandatory
    DESCRIPTION
            "Subnet Mask of this TRICOM-8 Unit."
        ::= { tricom-8-mgmt 9 }
triGateway OBJECT-TYPE
    SYNTAX   IpAddress
    ACCESS   read-write
    STATUS   mandatory
    DESCRIPTION
            "Gateway of this TRICOM-8 Unit."
        ::= { tricom-8-mgmt 10 }
triDNS OBJECT-TYPE
    SYNTAX   IpAddress
    ACCESS   read-write
    STATUS   mandatory
    DESCRIPTION
            "Domain Name Server of this TRICOM-8 Unit."
        ::= { tricom-8-mgmt 11 }
triHostName OBJECT-TYPE
    SYNTAX   DisplayString (SIZE (0..15))
    ACCESS   read-write
    STATUS   mandatory
    DESCRIPTION
            "Host Name of this TRICOM-8 Unit."
        ::= { tricom-8-mgmt 12 }
triDomain OBJECT-TYPE
    SYNTAX   DisplayString (SIZE (0..15))
    ACCESS   read-write
    STATUS   mandatory
    DESCRIPTION
            "Domain of this TRICOM-8 Unit."
        ::= { tricom-8-mgmt 13 }
triPhoneEnabled OBJECT-TYPE
    SYNTAX   INTEGER {
            disabled(1),   -- Phone interface is DISABLED
            enabled(2)     -- Phone interface is ENABLED
            }
    ACCESS   read-write
    STATUS   mandatory
    DESCRIPTION
            "Operational mode of the phone interface."
        ::= { tricom-8-mgmt 14 }
triBlockNoCallerID OBJECT-TYPE
    SYNTAX   INTEGER {
            noblock(1),    -- Calls with no CallerID are allowed
            block(2)       -- Calls with no CallerID are blocked
            }
    ACCESS   read-write
    STATUS   mandatory
    DESCRIPTION
            "No CallerID blocking mode."
        ::= { tricom-8-mgmt 15 }
triPhonePin OBJECT-TYPE
    SYNTAX   DisplayString (SIZE (0..15))
    ACCESS   read-write
    STATUS   mandatory
```

-continued

```
        DESCRIPTION
                "PIN used to ACCESS   the phone interface. This must be
                at least 6 characters."
        ::= { tricom-8-mgmt 16 }
triSyslogServer OBJECT-TYPE
        SYNTAX   DisplayString (SIZE (0..59))
        ACCESS   read-write
        STATUS   mandatory
        DESCRIPTION
                "Server name to send BSD Syslog style log events to. Set this to a
                NULL string to disable Syslog. (events will still be logged locally)"
        ::= { tricom-8-mgmt 17 }
triLoggingFacility OBJECT-TYPE
        SYNTAX   INTEGER {
                local-0(1),
                local-1(2),
                local-2(3),
                local-3(4),
                local-4(5),
                local-5(6),
                local-6(7),
                local-7(8)
                }
        ACCESS   read-write
        STATUS   mandatory
        DESCRIPTION
                "BSD Syslog Logging Facility."
        ::= { tricom-8-mgmt 18 }
triLoggingLevel OBJECT-TYPE
        SYNTAX   INTEGER {
                emergency(1),
                alert(2),
                critical(3),
                error(4),
                warning(5),
                notice(6),
                informational(7),
                debug(8)
                }
        ACCESS   read-write
        STATUS   mandatory
        DESCRIPTION
                "BSD Syslog Logging Level. This affects the amount of logging performed."
        ::= { tricom-8-mgmt 19 }
triDumpLogs OBJECT-TYPE
        SYNTAX   INTEGER {
                nodump(1),   -- do not dump logs to email
                dump(2)      -- dump logs to email
                }
        ACCESS   read-write
        STATUS   mandatory
        DESCRIPTION
                "Dump Logs to email when full option."
        ::= { tricom-8-mgmt 20 }
triSMTServer OBJECT-TYPE
        SYNTAX   DisplayString (SIZE (0..59))
        ACCESS   read-write
        STATUS   mandatory
        DESCRIPTION
                "Server used to send email."
        ::= { tricom-8-mgmt 21 }
triEmailTo OBJECT-TYPE
        SYNTAX   DisplayString (SIZE (0..59))
        ACCESS   read-write
        STATUS   mandatory
        DESCRIPTION
                "Address to send email to."
        ::= { tricom-8-mgmt 22 }
triEmailFrom OBJECT-TYPE
        SYNTAX   DisplayString (SIZE (0..59))
        ACCESS   read-write
        STATUS   mandatory
        DESCRIPTION
                "Address to send email from."
::= { tricom-8-mgmt 23 }
triEmailSubject OBJECT-TYPE
        SYNTAX   DisplayString (SIZE (0..59))
        ACCESS   read-write
        STATUS   mandatory
```

```
            DESCRIPTION
                    "Subject of email."
            ::= { tricom-8-mgmt 24 }
triOutletConfirmation OBJECT-TYPE
            SYNTAX    INTEGER {
                    noconfirm(1),    -- do not confirm outlet changes
                    confirm(2)       -- confirm outlet changes
                    }
            ACCESS    read-write
            STATUS    mandatory
            DESCRIPTION
                    "Whether or not to confirm outlet changes from web
                    interface."
            ::= { tricom-8-mgmt 32 }
triwebRefresh OBJECT-TYPE
            SYNTAX    INTEGER (5..999)
            ACCESS    read-write
            STATUS    mandatory
            DESCRIPTION
                    "Number of seconds (5-999) to wait before refreshing
                    outlets on web interface."
            ::= { tricom-8-mgmt 33 }
triOutletStaggerTime OBJECT-TYPE
            SYNTAX    INTEGER (0..5000)
            ACCESS    read-write
            STATUS    mandatory
            DESCRIPTION
                    "Number of milliseconds (0-5,000) to pause between outlets when
                    turning on/off multiple outlets at once."
            ::= { tricom-8-mgmt 34 }
triOSchedules OBJECT-TYPE
            SYNTAX    SEQUENCE OF TriScheduleEntry
            ACCESS    not-accessible
            STATUS    mandatory
            DESCRIPTION
                    "A List of Schedules."
            ::= { tricom-8-mgmt 35 }
triScheduleEntry OBJECT-TYPE
            SYNTAX    TriScheduleEntry
            ACCESS    not-accessible
            STATUS    mandatory
            DESCRIPTION
                    "An outlet schedule entry"
            INDEX    { triScheduleIndex }
            ::= { triOSchedules 1 }
TriScheduleEntry ::=
            SEQUENCE {
                triScheduleIndex
                    INTEGER,
                triScheduleEnabled
                    INTEGER
            }
triScheduleIndex OBJECT-TYPE
            SYNTAX    INTEGER (1..8)
            ACCESS    read-only
            STATUS    mandatory
            DESCRIPTION
                    "A unique value for each outlet. Its value
                    ranges between 1 and oNumber."
            ::= { triScheduleEntry 1 }
triScheduleEnabled OBJECT-TYPE
            SYNTAX    INTEGER {
                    disabled(1),    -- outlet is disabled
                    enabled(2)      -- outlet is enabled
                    }
            ACCESS    read-write
            STATUS    mandatory
            DESCRIPTION
                    "Enable STATUS    of schedule."
            ::= { triScheduleEntry 2 }
trilogs OBJECT-TYPE
            SYNTAX    SEQUENCE OF TriLogEntry
            ACCESS    not-accessible
            STATUS    mandatory
            DESCRIPTION
                    "A List of Log Entries."
            ::= { tricom-8-mgmt 38 }
triLogEntry OBJECT-TYPE
            SYNTAX    TriLogEntry
```

```
            ACCESS   not-accessible
            STATUS   mandatory
            DESCRIPTION
                "A Log Entry Display String."
            INDEX    { triLogIndex }
            ::= { trilogs 1 }
TriLogEntry ::=
            SEQUENCE {
               triLogIndex
                    INTEGER,
               triLogString
                    DisplayString
            }
triLogIndex OBJECT-TYPE
            SYNTAX   INTEGER (1..32)
            ACCESS   read-only
            STATUS   mandatory
            DESCRIPTION
                    "A unique value for each log entry. Its value
                    ranges between 1 and trinumlogs."
            ::= { triLogEntry 1 }
triLogString OBJECT-TYPE
            SYNTAX   DisplayString
            ACCESS   read-only
            STATUS   mandatory
            DESCRIPTION
                    "The log entry in string form."
            ::= { triLogEntry 2 }
triNumLogs OBJECT-TYPE
            SYNTAX   INTEGER
            ACCESS   read-only
            STATUS   mandatory
            DESCRIPTION
                    "The number of Log entries available"
            ::= { tricom-8-mgmt 39 }
-- TRAPS
triOutletCurrentTraps OBJECT-TYPE
            SYNTAX   SEQUENCE OF TriCurrentTrapEntry
            ACCESS   not-accessible
            STATUS   mandatory
            DESCRIPTION
                    "Table of current trap limits."
            ::= { tricom-8-traps 1 }
triCurrentTrapEntry OBJECT-TYPE
            SYNTAX   TriCurrentTrapEntry
            ACCESS   not-accessible
            STATUS   mandatory
            DESCRIPTION
                    "An outlet entry containing STATUS   and properties
                    of a managed outlet."
            INDEX    { triCurIndex }
            ::= { triOutletCurrentTraps 1 }
TriCurrentTrapEntry ::=
            SEQUENCE {
               triCurIndex
                    INTEGER,
               triCurLoEnabled
                    INTEGER,
               triCurLoBound
                    DisplayString,
               triCurLoGracePeriod
                    INTEGER (0..65535),
               triCurHiEnabled
                    INTEGER,
               triCurHiBound
                    DisplayString,
               triCurHiGracePeriod
                    INTEGER (0..65535)
            }
triCurIndex OBJECT-TYPE
            SYNTAX   INTEGER (1..8)
            ACCESS   read-only
            STATUS   mandatory
            DESCRIPTION
                    "A unique value for each outlet. Its value
                    ranges between 1 and the value of oNumber."
            ::= { triCurrentTrapEntry 1 }
```

-continued

```
triCurLoEnabled OBJECT-TYPE
    SYNTAX    INTEGER {
            disabled(1),     -- trap is disabled
            enabled(2)       -- trap is enabled
        }
    ACCESS    read-write
    STATUS    mandatory
    DESCRIPTION
            "Low current bound trap enable. When enabled, a trap will
            be generated when current falls below triCurLoBound and
            stays below for longer than triCurLoGracePeriod."
    ::= { triCurrentTrapEntry 2 }
triCurLoBound OBJECT-TYPE
    SYNTAX    DisplayString (SIZE(0..20))
    ACCESS    read-write
    STATUS    mandatory
    DESCRIPTION
            "Low current boundary. This string must contain only a valid
            floating-point number representing current in Amps between
            0.0 and 99.9. When the outlet current falls below this value,
            and stays below for longer than triCurLoGracePeriod a trap
            will be generated."
    ::= { triCurrentTrapEntry 3 }
triCurLoGracePeriod OBJECT-TYPE
    SYNTAX    INTEGER (0..65535)
    ACCESS    read-write
    STATUS    mandatory
    DESCRIPTION
            "Low current grace period in Seconds. When the outlet
            current falls below triCurLoBound, and stays below for longer
            than this value, a trap will be generated. Care should be
            taken not to set this too low, or the network might be
            flooded with traps if the current rapidly fluctuates around
            triCurLoBound."
    ::= { triCurrentTrapEntry 4 }
triCurHiEnabled OBJECT-TYPE
    SYNTAX    INTEGER }
            disabled(1),     -- trap is disabled
            enabled(2)       -- trap is enabled
        }
    ACCESS    read-write
    STATUS    mandatory
    DESCRIPTION
            "High current bound trap enable. When enabled, a trap will
            be generated when current rises above triCurHiBound and
            stays above for longer than triCurHiGracePeriod."
    ::= { triCurrentTrapEntry 5 }
triCurHiBound OBJECT-TYPE
    SYNTAX    DisplayString (SIZE(0..20))
    ACCESS    read-write
    STATUS    mandatory
    DESCRIPTION
            "High current boundary. This string must contain only a valid
            floating-point number representing current in Amps between
            0.0 and 99.9 When the outlet current rises above this value,
            and stays above for longer than triCurHiGracePeriod a trap
            will be generated."
    ::= { triCurrentTrapEntry 6 }
triCurHiGracePeriod OBJECT-TYPE
    SYNTAX    INTEGER (0..65535)
    ACCESS    read-write
    STATUS    mandatory
    DESCRIPTION
            "High current grace period in Milliseconds. When the outlet
            Current rises above triCurHiBound, and stays above for longer
            than this value, a trap will be generated. Care should be
            taken not to set this too low, or the network might be
            flooded with traps if the current rapidly fluctuates around
            triCurHiBound."
    ::= { triCurrentTrapEntry 7 }
triOutletTrapped OBJECT-TYPE
    SYNTAX    INTEGER
    ACCESS    read-only
    STATUS    mandatory
    DESCRIPTION
            "The outlet that caused a trap (1-oNumber). This trap variable
            is supplied for convenience. It should allow a management tool
            to respond to outlet-specific traps with less parsing."
    ::= { tricom-8-traps 2 }
```

```
                              -continued tricomTotalCurrentCritical TRAP-TYPE
    ENTERPRISE cyberswitching
    VARIABLES { oTotCurrentStr, oTotCurrentFloat }
    DESCRIPTION
        "Total current has gone above unit's circuit protection."
    ::= 1
tricomTotalCurrentWarning TRAP-TYPE
    ENTERPRISE cyberswitching
    VARIABLES { oTotCurrentStr, oTotCurrentFloat }
    DESCRIPTION
        "Total current has gone above rated unit capacity."
    ::= 2
tricomOutletLowCurrentWarning TRAP-TYPE
    ENTERPRISE cyberswitching
    VARIABLES { triOutletTrapped, oCurrentStr, oCurrentFloat }
    DESCRIPTION
        "Current has gone below triCurLoBound and
        stayed there for longer than triCurLoGracePeriod."
    ::= 3
tricomOutletHighCurrentWarning TRAP-TYPE
    ENTERPRISE cyberswitching
    VARIABLES { triOutletTrapped, oCurrentStr, oCurrentFloat }
    DESCRIPTION
        "Current has gone above triCurHiBound and
        stayed there for longer than triCurHiGracePeriod."
    ::= 4
END
```

Embodiment in a Programmed Information Appliance

Figure 29:
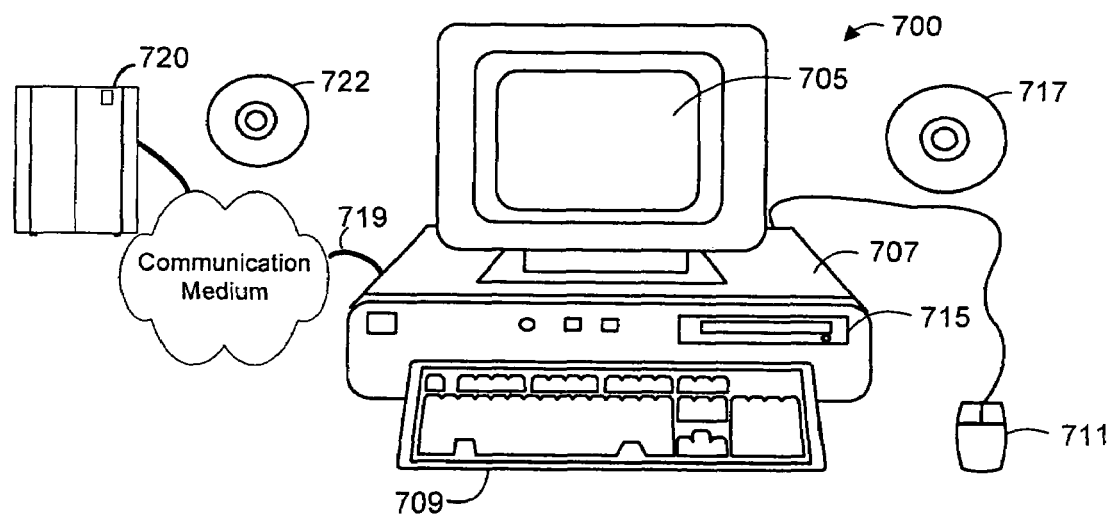
FIG. 29 is a block diagram showing a representative example logic device in which various aspects of the present invention may be embodied.

FIG. 29 is a block diagram showing a representative example logic device in which various aspects of the present invention may be embodied. As will be understood to practitioners in the art from the teachings provided herein, the invention can be implemented in hardware and/or software. In some embodiments of the invention, different aspects of the invention can be implemented in either client-side logic or server-side logic. As will be understood in the art, the invention or components thereof may be embodied in a fixed media program component containing logic instructions and/or data that when loaded into an appropriately configured computing device cause that device to perform according to the invention. As will be understood in the art, a fixed media containing logic instructions may be delivered to a viewer on a fixed media for physically loading into a viewer's computer or a fixed media containing logic instructions may reside on a remote server that a viewer accesses through a communication medium in order to download a program component.

FIG. 29 shows an information appliance (or digital device) 700 that may be understood as a logical apparatus that can read instructions from media 717 and/or network port 719, which can optionally be connected to server 720 having fixed media 722. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717, or fixed media 722 over port 719, may be used to program such a system and may represent a disk-type optical or magnetic media, magnetic tape, solid state dynamic or static memory, etc. In specific embodiments, the invention may be embodied in whole or in part as software recorded on this fixed media. Communication port 719 may also be used to initially receive instructions that are used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language, which may be used to create an ASIC, or PLD that operates as herein described.

Other Embodiments

The invention has now been described with reference to specific embodiments. Other embodiments will be apparent to those of skill in the art. In particular, a viewer digital information appliance has generally been illustrated as a personal computer. However, the digital computing device is meant to be any information appliance for interacting with a remote data application, and could include such devices as a digitally enabled television, cell phone, personal digital assistant, laboratory or manufacturing equipment, etc. It is understood that the examples and embodiments described herein are for illustrative purposes and that various modifications or changes in light thereof will be suggested by the teachings herein to persons skilled in the art and are to be included within the spirit and purview of this application and scope of the claims.

Furthermore, various different actions can be used to effect power management. For example, a voice command may be spoken by the purchaser, a key may be depressed by the purchaser, a button on a client-side scientific device may be depressed by the user, or selection using any pointing device may be effected by the user.

All publications, patents, and patent applications cited herein or filed with this application, including any references filed as part of an Information Disclosure Statement, are incorporated by reference in their entirety.

Figure 30:
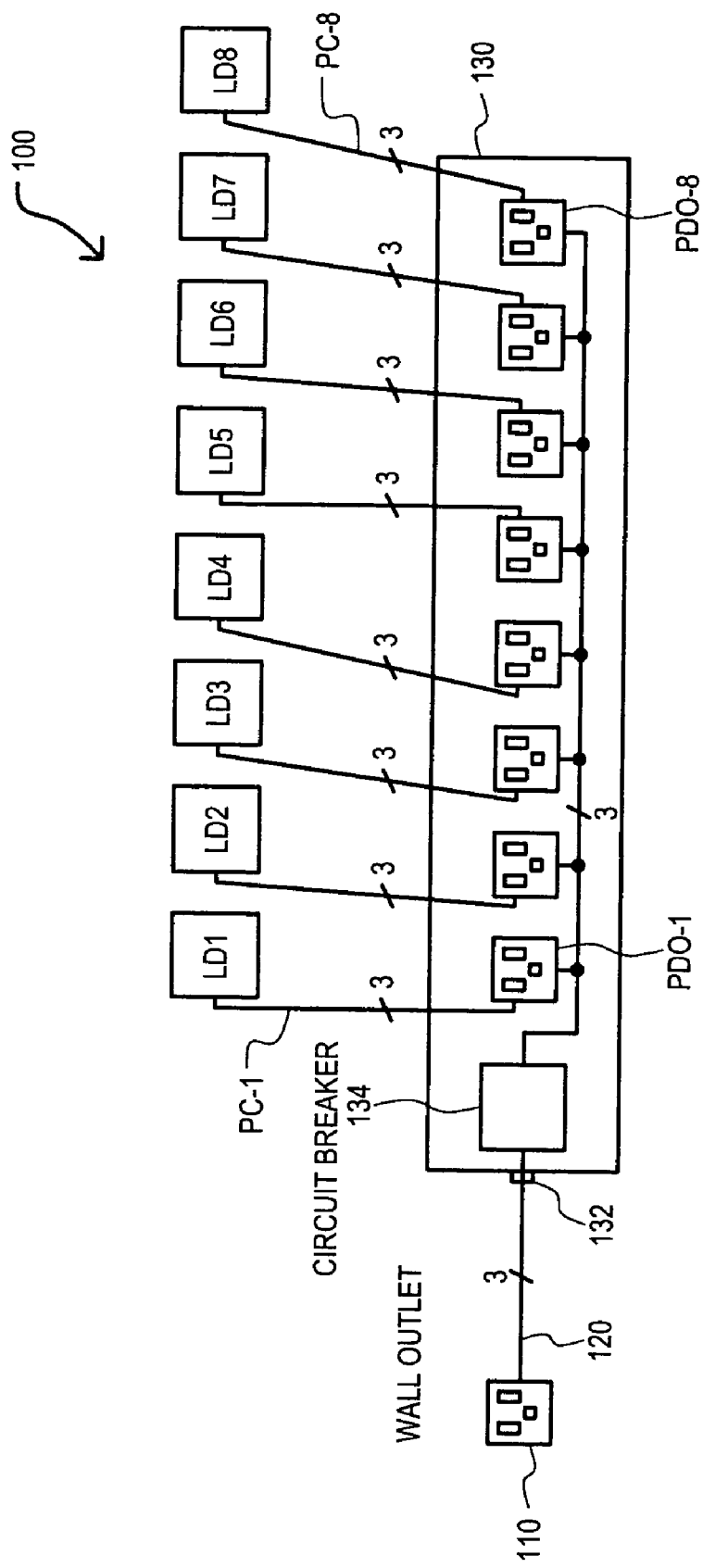
FIG. 30 is a block schematic diagram of an apparatus including a conventional power distribution unit (PDU) for power management of a plurality of devices.
Figure 31:
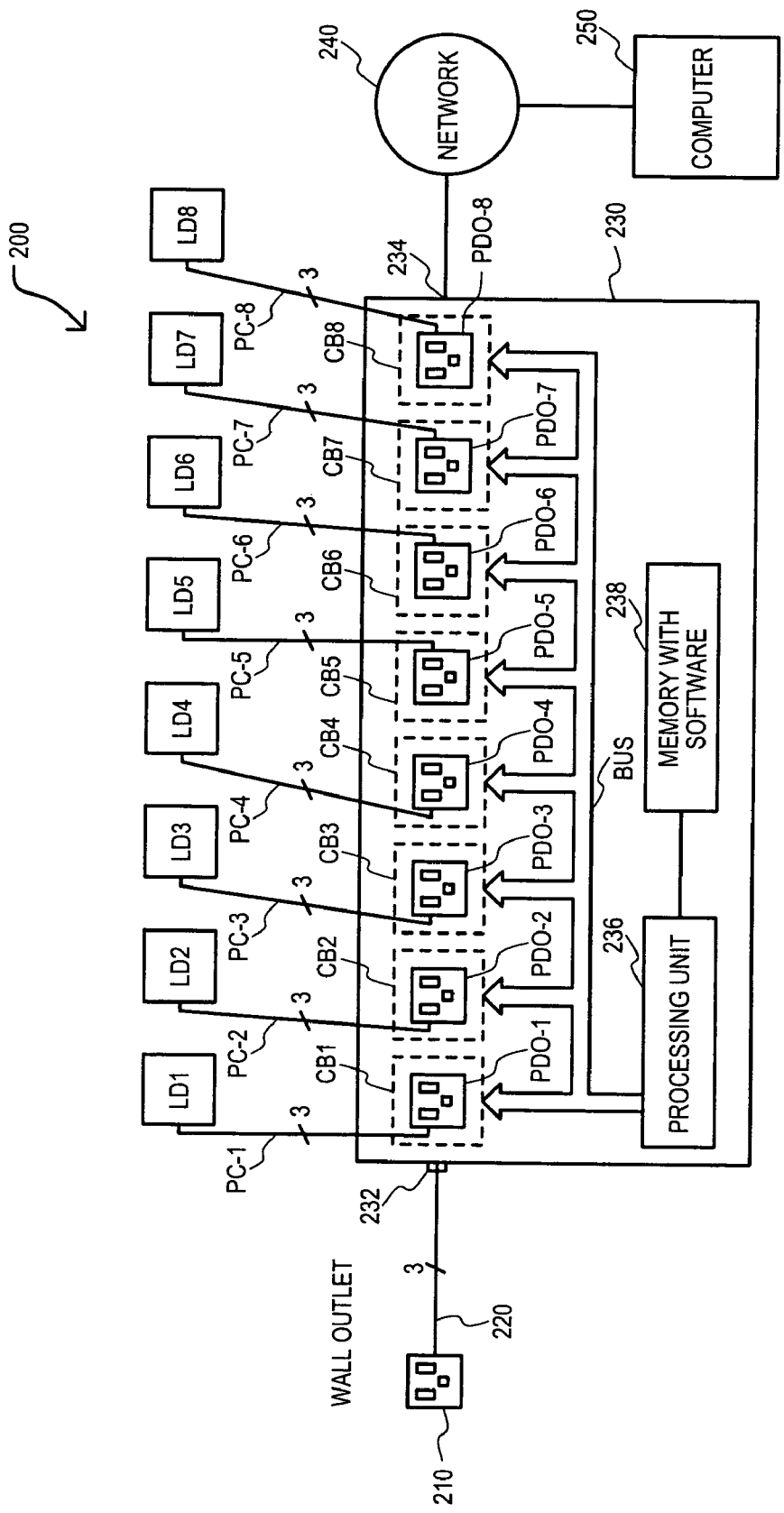
FIG. 31 is a block schematic diagram of a power distribution apparatus according to an embodiment.

Referring now to FIG. 31, a block schematic diagram of a power distribution apparatus according to an embodiment is set forth and given the general reference character 200. Apparatus 200 may include similar constituents as apparatus 100 of FIG. 30 and such constituents may be referred to by the same reference character.

Apparatus 200 may include a wall outlet 210, a power cord 220, a power distribution unit 230, load devices (LD1 to LD8), a network 240, and a computer 250.

Power cord 220 may provide an electrical connection between wall outlet 210 and an input terminal 232 of power distribution unit 230. Power distribution unit 230 may include a port 234 connected to network 240. Computer 250 may optionally be connected to network 240. Each load device (LD1 to LD8) may be connected to a respective power distribution outlet (PDO-1 to PDO-8) through a respective power cord (PC-1 to PC-8).

Power distribution unit 230 may include a processing unit 236 and a memory 238. Each power distribution outlet (PDO-1 to PDO-8) may have a respective circuit breaker unit (CB1 to CB8) associated therewith. Processing unit 236 may be connected to each circuit breaker unit (CB1 to CB8) by way of a bus BUS.

The operation of the power distribution apparatus 200 will now be discussed.

Each circuit breaker unit (CB1 to CB8) may be independently set to trip at an independent current value. A user may set the independent current value for each circuit breaker unit (CB1 to CB8) at computer 250. These values may be transferred through network 240 to port 234 of PDU 230. Processing unit 236 may operate under the control of software stored in memory 238 to sample current flowing through each circuit breaker unit (CB1 to CB8) by sending instructions and receiving current data values along bus BUS. In this way, the current flowing between each power distribution outlet (PDO-1 to PDO-8) and each respective load device (LD1 to LD8) may be monitored.

Processing unit 236 may sample the current data values and capture a digital version of a current waveform of the current flowing through each circuit breaker unit (CB1 to CB8). Processing unit 236 may then perform parametric calculations on each waveform to provide the current values to be used in a comparison step. In the comparison step, processing unit 236 may determine if the current value is greater than the previously programmed independent current value. If any of the comparisons show the sampled current value is greater, then a trip command may be sent to the circuit breaker unit (CB1 to CB8) having the overcurrent condition. The trip command may instruct the circuit breaker unit (CB1 to CB8) to trip. In this way, each power distribution outlet (PDO-1 to PDO-8) may have an independently programmed current value (e.g., circuit breaker current rating). These independently programmed current values may be changed by a user through a software interface at computer 250 at essentially any time.

The above-mentioned parametric calculation performed by processing unit 236 on each current waveform may include peak current, root-mean-square (RMS) current, and crest factor harmonic current, as just a few examples.

In the above-mentioned operation, an overcurrent protection value may be independently programmed for each power distribution outlet. In this case, the independently programmed current values may be set to protect load devices (LD1 to LD8) from current spikes, which may cause hardware damage. However, it may also be desirable to provide protection against current magnitudes that may only cause damage or adverse effects if a current magnitude is sustained for a predetermined time period. Such a feature of the embodiment of FIG. 2 will now be described in detail.

Each circuit breaker unit (CB1 to CB8) may be independently set to trip at an independent sustained current value over an independent time period. A user may set the independent sustained current value and independent time period for each circuit breaker unit (CB1 to CB8) at computer 250. These values may be transferred through network 240 to port 234 of PDU 230. Processing unit 236 may operate under the control of software stored in memory 238 to sample current flowing through each circuit breaker unit (CB1 to CB8) by sending instructions and receiving current data values along bus BUS. In this way, the current flowing between each power distribution outlet (PDO-1 to PDO-8) and each respective load device (LD1 to LD8) may be monitored.

Processing unit 236 may sample the current data values and capture a digital version of a current waveform of the current flowing through each circuit breaker unit (CB1 to CB8). Processing unit 236 may then perform parametric calculations on each waveform to provide the current values to be used in a comparison step. In the comparison step, processing unit 236 may determine if the current value is greater than the previously programmed independent sustained current value. If any of the comparisons show the sampled current value is greater, then processing unit 236 may re-sample the current data value of the circuit breaker unit (CB1 to CB8) having the initial overcurrent condition after the independent time period for that circuit breaker unit (CB1 to CB8) has elapsed.

Then, processing unit 236 may capture a second digital version of a current waveform of the current flowing through the circuit breaker unit (CB1 to CB8) having the initial overcurrent condition. Processing unit 236 can perform a second parametric calculation on a second captured waveform to provide a current value to be used in a second comparison step. In the second comparison step, processing unit 236 may determine if the current value is greater than the previously programmed independent sustained current value. If the comparison shows the sampled current value is still greater, then a trip command may be sent to the circuit breaker unit (CB1 to CB8) having the sustained overcurrent condition. The trip command may instruct the circuit breaker unit (CB1 to CB8) to trip.

In this way, each power distribution outlet (PDO-1 to PDO-8) may have an independently programmed protection against current magnitudes that may only cause damage or adverse affects if a current magnitude is sustained for a predetermined time period. The sustained current magnitudes and predetermined time periods may be independently programmed for each power distribution outlet (PDO-1 to PDO-8). Alternately, a time period that is the same for all the power distribution outlets (PDO-1 to PDO-8) or a subset of power distribution outlets (PDO-1 to PDO-8) may be set or used as an initial default. These independently programmed current values and time periods may be changed by a user through a software interface at computer 250 at any time.

The above-mentioned parametric calculation performed by processing unit 236 on each current waveform may include peak current, root-mean-square (RMS) current, and crest factor harmonic current, as just a few examples.

In the above-mentioned operation, the current values for each power distribution outlet (PDO-1 to PDO-8) are sampled. If an initial comparison shows that there is a potential sustained overcurrent condition, another sample is taken after a predetermined time period has elapsed. However, it may be desirable to continuously sample the current value after the initial sample has indicated the potential sustained overcurrent condition. In this case, the command for the circuit breaker unit (CB1 to CB8) to trip may only be executed if all of the plurality of samples during the predetermined time period indicate the continuous overcurrent condition in the comparison step. In this way, dips below the continuous overcurrent condition may reset the algorithm back to the initial sample and comparison steps.

In yet another feature of the embodiment of FIG. 2, a user may independently set a time percentage of overcurrent condition in a predetermined time period. In this way, sampling and comparison steps may be performed as in the above-mentioned continuous overcurrent condition check. However, the trip command to the circuit breaker unit (CB1 to CB8) may only be executed if the overcurrent condition has occurred over a predetermined percentage of a predetermined time period.

Figure 32:
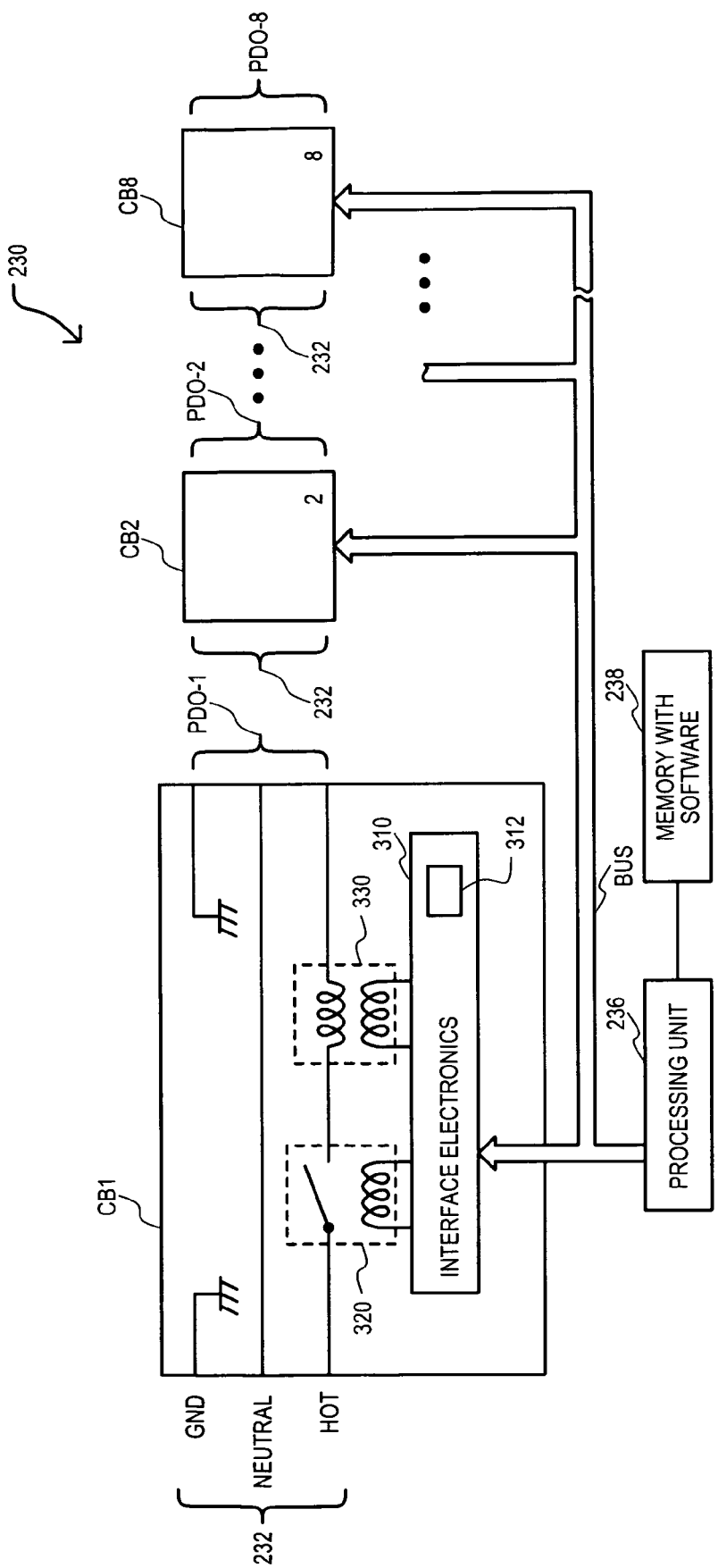
FIG. 32 is a circuit schematic diagram of selected portions of a power distribution unit according to an embodiment.

Referring now to FIG. 32, a circuit schematic diagram of selected portions of power distribution unit 230 according to an embodiment are set forth.

FIG. 32 illustrates a circuit breaker unit (CB1 to CB8) in detail. Only the details of circuit breaker unit CB1 are illustrated in order to avoid unduly cluttering up the figure. However, circuit breaker units (CB2 to CB8) may include essentially the same constituents.

Circuit breaker unit CB1 may include a switching circuit 320, a current sampling circuit 330, and interface electronics 310. Circuit breaker unit CB1 may receive an input voltage from input terminal 232 and may provide an output voltage at power distribution outlet PDO-1. In this case, a 120 VAC may be received including a ground GND, neutral NEUTRAL and hot HOT.

Ground GND may be connected to a base of power distribution unit 230, as one example. Neutral NEUTRAL may pass directly through to power distribution outlet PDO-1. Switching circuit 320 and current sampling circuit 330 may be provided in series between the input terminal 232 and power distribution outlet PDO-1 in the hot HOT signal path.

Interface electronics 310 may provide control for switching circuit 320 and may sample current values provided by current sampling circuit 330. Interface electronics 310 may receive current values provided by current sampling circuit 330 in an analog form and may include an analog to digital converter 312 to provide digital current values. According to control signals from interface electronics 310 a switching circuit 320 may be opened to interrupt current flowing between power distribution outlet PDO-1 and load device LD1 connected thereto (illustrated in FIG. 31). In a similar fashion, interface electronics 310 may provide control for closing switching circuit 320 to allow current to flow between power distribution outlet PDO-1 and load device LD1 connected thereto (illustrated in FIG. 2).

Switching circuit 330 may include a mechanical relay or a solid-state relay, such as a thyristor, as just two examples. Current sampling circuit 330 may include an isolation step down transformer, a Hall effect device, a sense resistor or a magnetometer, as just a few examples.

Processing unit 236 may provide commands to interface electronics 310 based on an algorithm and programmed values (set as indicated above in the operation of the embodiment of FIG. 2), which may be stored in memory 238.

It is noted that each circuit breaker unit (CB1 to CB8) may commonly receive an input voltage from input terminal 232 and may provide an output voltage at a respective power distribution outlet (PDO-1 to PDO-8).

Memory 238 may be included on processing unit 236 or may be a separate integrated circuit, as just one example.

It is also noted that a PDU 230 may also provide additional current readings beyond those of individual power distribution outlets (PDO-1 to PDO-8). In particular, a PDU 230 may logically divide power distribution outlets (PDO-1 to PDO-8) into two or more banks. A current value for each such bank can be generated and monitored in the same general fashion as a power distribution outlet, as described above. As but one very particular example, a bank current value may be generated by summing current values of the respective power distribution outlets of the bank, or by an in-line monitoring structure (e.g., step-down transformer) assuming separate power line wiring for each bank.

In addition, in alternate embodiments, circuit breaker trip actions can be provided on a bank-by-bank basis. As but one example, individual circuit breakers for all power distribution outlets of a bank can be tripped essentially simultaneously in the event of a bank overcurrent condition. Alternatively, assuming separate power line wiring for each bank, a bank circuit breaker can be employed. Of course, limits for bank current values may also be programmable.

Along these same lines, a PDU 230 can provide an overall unit current reading for the PDU 230. As but one very particular example, a unit current value may be generated by summing currents to all of the power distribution outlets of the PDU 230, or by an in-line monitoring structure. Current limits for a PDU 230 can be programmable.

It follows that in alternate embodiments, circuit breaker trip actions can be provided for the PDU 230. As but one example, individual circuit breakers for all power distribution outlets of PDU 230 can be tripped essentially simultaneously in the event of a unit overcurrent condition. Alternatively, a unit circuit breaker can be employed.

In this way, warnings and/or circuit breaker trip actions can occur not only on an outlet-by-outlet basis, but also on a bank-by-bank and/or overall unit basis.

Figure 33:
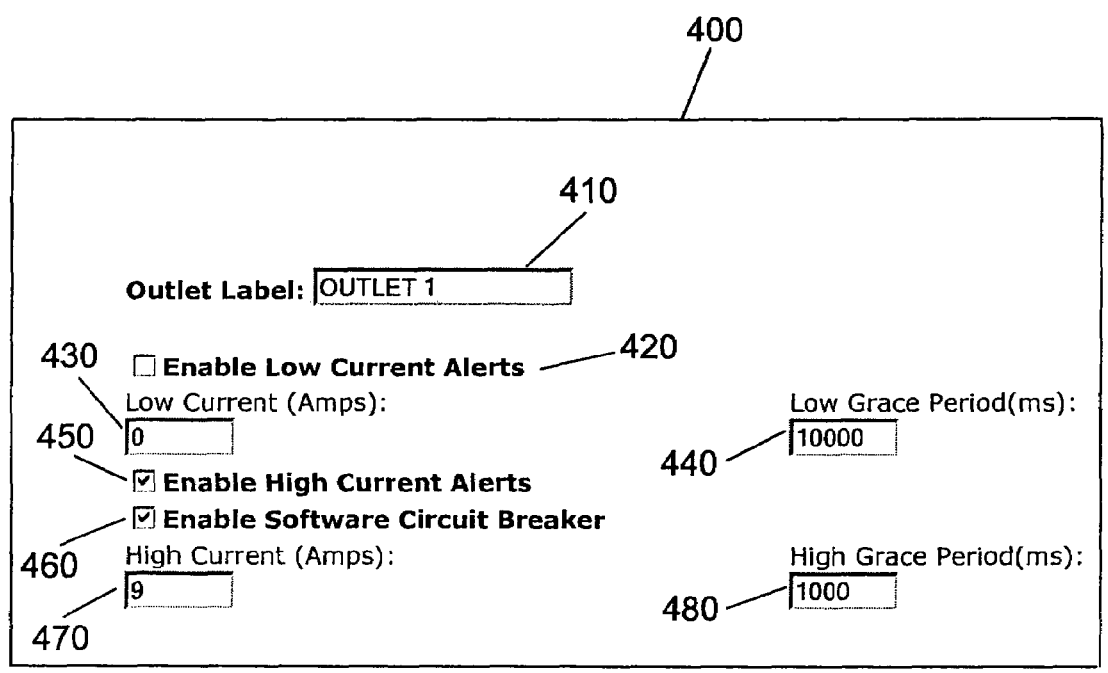
FIG. 33 is a user interface for inputting programmable values for a power distribution unit according to an embodiment.

Referring now to FIG. 33, a user interface for inputting programmable values for the power distribution unit 230, such as that shown in FIG. 32 is set forth and given the general reference character 400. User interface 400 may be a user interface on computer 250 of FIG. 31, for example.

Referring now to FIG. 33 in conjunction with FIG. 31, user interface 400 may include input boxes (410 to 480). Input box 410 may be used to select one of the power distribution outlets (PDO-1 to PDO-8). Once the power distribution outlet (PDO-1 to PDO-8) is selected, input boxes (420 to 480) may be input with values or selected with, for example a mouse click, to enable or disable features for the selected power distribution outlet (PDO-1 to PDO-8) identified in input box 410.

Input box 420 may be used to enable low current alerts. A low current alert may be used to notify a user when a current for a predetermined power distribution outlet (PDO-1 to PDO-8) has remained below a low current value for longer than a low grace period. Input box 430 may be used to provide the low current value and input box 440 may be used to provide the low grace period. In this case, processing unit 236 may monitor current flowing through the selected circuit breaker unit (CB1 to CB8) by sending instructions and receiving current data values along bus BUS. In this way, the current flowing between the selected power distribution outlet (PDO-1 to PDO-8) and a respective load device (LD1 to LD8) may be monitored. If the current flowing through the selected circuit breaker unit (CB1 to CB8) remains below the low current value as indicated by input box 430 for longer than a low grace period as indicated by input box 440, a user may be notified. A user may be notified by a pop-up window alert on computer 250, as just one example.

Input box 450 may be used to enable high current alerts and input box 460 may be used to enable the circuit breaker functions as described above with respect to FIGS. 31 and 32. A high current alert may be used to notify a user when a current for a predetermined power distribution outlet (PDO-1 to PDO-8) has remained above a high current value for longer than a high grace period. Input box 470 may be used to provide the high current value and input box 480 may be used to provide the high grace period. The high current value provided in input box 470 may correspond to a sustained current value as described above in the embodiment of FIG. 31. The high grace period provided in input box 480 may correspond to the time period for the sustained current value as described above in the embodiment of FIG. 31.

Other input boxes may be provided in the user interface 400. For example, an overcurrent protection value may be provided in an input box. In this way, each power distribution outlet (PDO-1 to PDO-8) may be protected against currents that may be instantaneously destructive to a load device (LD1 to LD8) as described above with respect to the embodiment of FIG. 31. In this case, an overcurrent protection value may be provided which may be just below a destructive value in order to provide adequate protection margin for the load device (LD1 to LD8).

Yet other input boxes may be provided for the user interface 400. For example, a time percentage input box may be provided to enable protection against a time percentage of overcurrent condition for a predetermined time period.

Each circuit breaker operating mode, destructive overcurrent, time period overcurrent, or the like, may include input boxes for enabling or disabling the operating mode as well as providing alerts to the user.

In FIG. 34, a user interface for monitoring the power distribution unit 230 of FIG. 31 is set forth and given the general reference character 500. User interface 500 may be a user interface on computer 250 of FIG. 31, for example.

Referring now to FIG. 5 in conjunction with FIG. 31, user interface 500 may include columns (510 to 570) of user information and icons for enabling functions.

Column 510 may include numbers for identifying the location of the power distribution outlet (PDO-1 to PDO-8) that the user information and icons on the row may correspond.

Column 520 may include an icon for identifying whether or not the corresponding power distribution outlet (PDO-1 to PDO-8) is on, off, or tripped, as just a few examples. The icons of column 520 may have a different color to indicate a condition of the power distribution outlet (PDO-1 to PDO-8). For example, green may indicate "on", black may indicate "off", and red may indicate "tripped".

Column 530 may include an icon for manually turning on a corresponding power distribution outlet (PDO-1 to PDO-8). Column 540 may include an icon for manually turning off a corresponding power distribution outlet (PDO-1 to PDO-8). When a power distribution outlet (PDO-1 to PDO-8) is in a "tripped" condition, it may be required to mouse click on the "OFF" icon before mouse clicking on the "ON" icon to reset the switching circuit 330 so that the power distribution outlet (PDO-1 to PDO-8) is reset to "on".

Column 550 may include a clock icon. By mouse clicking on the clock icon, a window may be open that can allow you to program a time schedule for the corresponding power distribution outlet (PDO-1 to PDO-8). A time schedule may include turning on and turning off selected power distribution outlets (PDO-1 to PDO-8) at predetermined time periods in a day.

Column 560 may include a name for a corresponding power distribution outlet (PDO-1 to PDO-8). The name may be, for example, the name of the load device (LD1 to LD8), such as printer, server, router, as just a few examples. In this way, the user may more conveniently identify the load device (LD1 to LD8) for which the user information and icons for enabling functions may correspond.

Column 570 may include values of current flowing through each circuit breaker unit (CB1 to CB8), which can correspond to current flowing between each power distribution outlet (PDO-1 to PDO-8) and respective load device (LD1 to LD8).

It is understood that although "mouse clicking" has been used as an example for selecting features on the user interfaces (400 and 500) any input device may be used, for example, a keyboard, a touch screen pointer, or the like.

Although the user interface of FIG. 34 illustrates a status of power distribution outlets (PDO-1 to PDO-8) in a graphical form, simple text may be used as well. For example, a "tripped" condition may be indicated with the word "trip" next to the corresponding power distribution outlet (PDO-1 to PDO-8) label.

The embodiment of FIG. 31 may be used in conjunction with other circuit protection. For example, circuit protection for a wall outlet (210) may already be provided at a circuit breaker box. However, with the embodiment of FIG. 31, individual cord connected devices may have customized protection. For example, a breaker box may have a breaker rated at 15 Amps, but with the embodiment of FIG. 31, a load device (LD1 to LD8) may have customized protection of 5 Amps. Such customized protection may be needed, for example, in a computer system or the like.

The apparatus 200 of FIG. 31 may prevent catastrophic current from one load device (LD1 to LD8) from causing a circuit breaker to "trip" and interrupt power to all the load devices as in the prior art. Instead, only the power distribution outlet (PDO-1 to PDO-8) which is providing power to the load device (LD1 to LD8) having the catastrophic current will have power interrupted. This can be desirable in, for example, a series of network devices all plugged into the PDU 230. In this way, only the offending network device will have power interrupted and employee downtime may be reduced or eliminated.

Apparatus 200 may include other advantages. For example, when a hardware upgrade occurs and a newly connected load device (LD1 to LD8) draws a larger current, problems may occur with the conventional approach of FIG. 30. For example, if five load devices (LD1 to LD5) are connected to PDU 230 and each load device draws 3 amps and the outlet is protected at 15 amps. Then, load device LD5 is changed to a load device that draws 5 amps. With apparatus 200, only the newly connected load device LD5 may have power interrupted.

A circuit protection system as in apparatus 200 may be used to protect power supplies. As one example, a plurality of supplies may be used to provide current to a shared load that draws more current than a single supply can provide. By providing a circuit breaker unit (CB1 to CB8) to each power supply, the power supplies may be protected. For example, if one power supply goes bad, all the other power supplies may be protected by programming the programmable current characteristics so that each individual circuit breaker unit (CB1 to CB8) disconnects the power supply from the load if an overcurrent condition exists. In this way, all the power supplies may be protected.

In another case, a PDU may be connected to an outlet that can provide more current than the rating of the PDU. In this case, PDU 230 may be used and it can provide adequate self protection by properly programming the programmable current characteristics.

It is understood that the embodiments described above are exemplary and the present invention should not be limited to those embodiments. Specific structures should not be limited to the described embodiments.

For example, in the embodiment of FIGS. 31 and 32, a power supply of 120 VAC is received at input terminal 232. However, a power supply may be 240 VAC. In this case, two "hot" wires may be used and switching circuit 320 may provide a switch for both "hot" wires. In another example, a DC voltage may be provided. In this case, a switching circuit 320 may only provide a switch to the power supply voltage (VDD). Also, in the case of a DC voltage, parametric calculations may not be necessary for processing unit 236 to perform.

Figure 35:
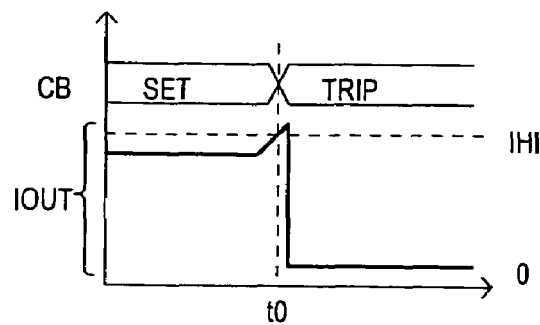
FIG. 35 is a timing diagram showing a first mode of operation for embodiments of the present invention.

Referring now to FIG. 35, a graph is set forth illustrating one operating mode for embodiments of the invention. FIG. 35 includes a waveform CB that represents the operation of a circuit breaker for an individual outlet or bank of outlets. Waveform IOUT shows a current output from such a circuit breaker. A current value IHI represents a programmed high limit, and is understood to be selectable by a user.

Referring still to FIG. 35, at time t0, current IOUT exceeds a programmed high limit IHI. Such a current value is detected for a given outlet/bank, compared by operation of software to the programmable limit IHI. Because the limit is exceeded, a "trip" value can be generated. As but one example, a processor may write a predetermined byte value to a register that indicates a trip operation. In response to such a value, a switching circuit opens the current path(s) for the outlet/bank.

Figure 36:
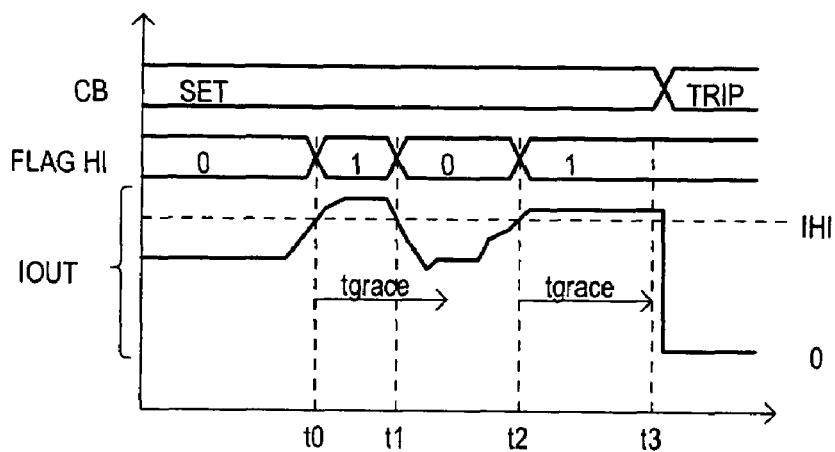
FIG. 36 is a timing diagram showing a second mode of operation for embodiments of the present invention.

Referring now to FIG. 36, a graph is set forth illustrating another operating mode for embodiments of the invention. FIG. 36 includes the same general waveforms as FIG. 35. In addition, FIG. 36 also shows a waveform FLAG HI that can represent a flag that indicates when a current value first exceeds a limit. However, unlike the arrangement of FIG. 35, in the operation of FIG. 36 a PDU (e.g., 230) includes a programmable grace period (tgrace). A circuit breaker for an outlet/bank will only be tripped if the current value remains over the limit for the entire grace period.

Referring still to FIG. 36, at time t0, current IOUT exceeds a programmed high limit IHI. As a result, flag value FLAG HI is set (represented by a "1").

At time t1, current IOUT falls below limit IHI prior to expiration of grace period (tgrace). Consequently, flag value FLAG HI is reset (represented by a return to "0").

At time t2, current IOUT once again exceeds a programmed high limit IHI. As a result, flag value FLAG HI is once again set (represented by a "1").

At time t3, current IOUT remains above limit IHI and the grace period has expired (i.e., flag value FLAG HI is still set). As a result, a circuit breaker can be tripped.

Figure 37:
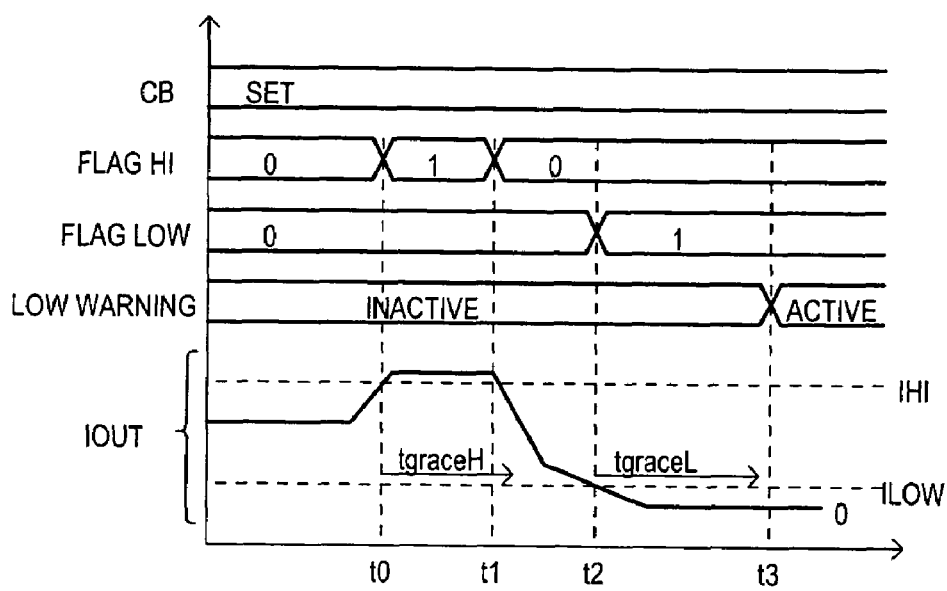
FIG. 37 is a timing diagram showing a third mode of operation for embodiments of the present invention.

Referring now to FIG. 37, a graph is set forth illustrating yet another operating mode for embodiments of the invention. FIG. 37 includes the same general waveforms as FIG. 36. In addition, FIG. 37 also shows a waveform FLAG LOW that can represent a flag indicating when a current value falls below a low current limit (ILOW), and a waveform LOW WARNING that can indicate a warning issued by a PDU. Unlike the arrangement of FIG. 36, in the operation of FIG. 37 a PDU further includes a low programmable grace period (tgraceL). In the very particular example, a circuit breaker for an outlet/bank will provide a warning if the current value remains under the low limit for a low grace period (tgraceL).

Referring still to FIG. 37, at time t0, current IOUT exceeds a programmed high limit IHI. As a result, flag value FLAG HI is set (represented by a "1").

At time t1, current IOUT falls below high programmed limit IHI. As a result, flag value FLAG HI is reset (represented by a return to "0").

At time t2, current IOUT falls below low programmed limit ILOW. As a result, flag value FLAG LOW is set (represented by a "1").

At time t3, current IOUT remains below limit ILOW and the low grace period (tgraceL) has expired (i.e., flag value FLAG LOW is still set). As a result, a low current warning can be issued.

Having described the structure and operation of various embodiments, methods according to the present invention will now be described.

Figure 38:
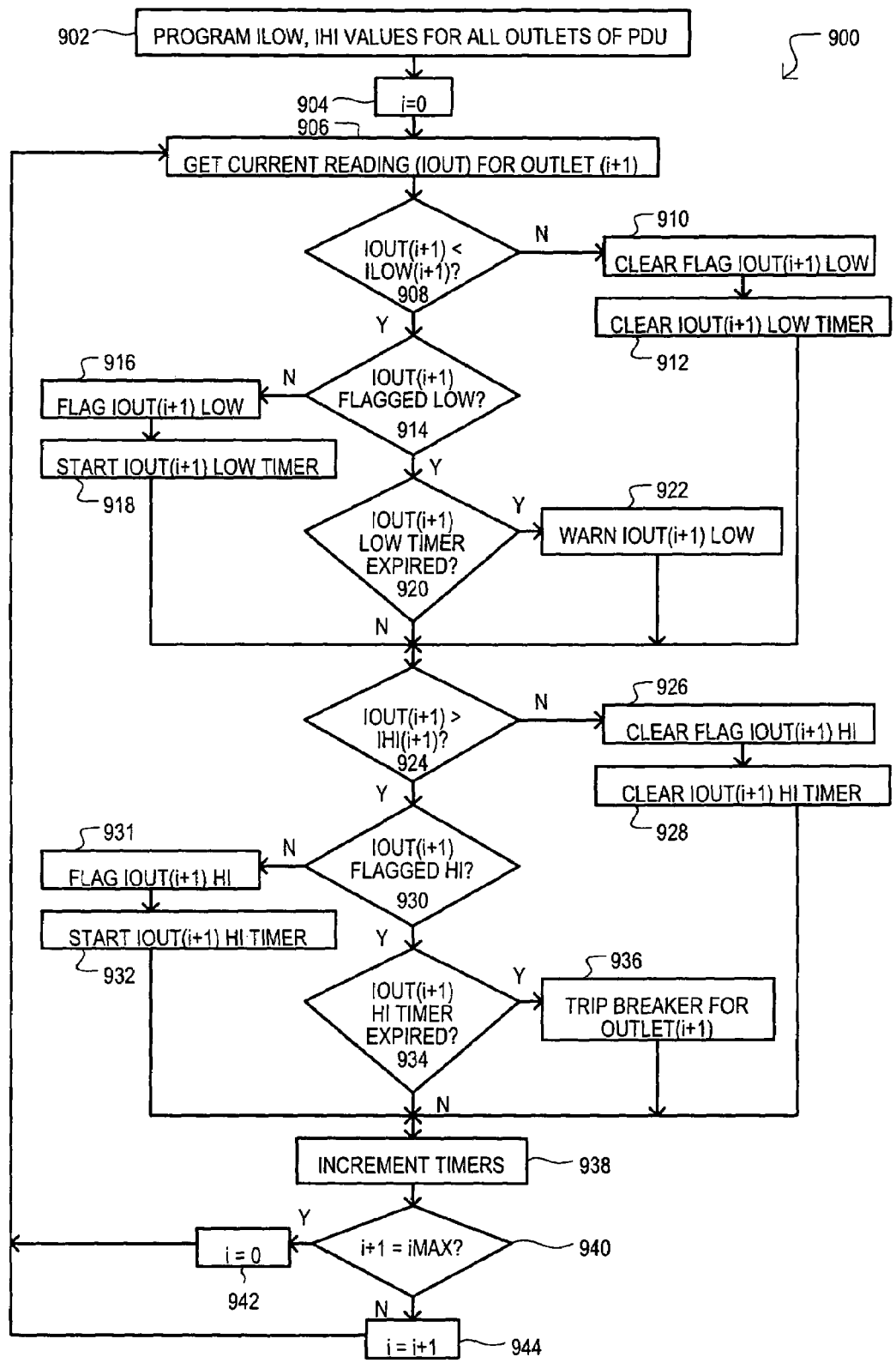
FIG. 38 is a flow diagram of a method according to one embodiment of the present invention.

Referring now to FIG. 38, one example of a method according to the present invention is set forth in a flow diagram and designated by the general reference character 900. A method 900 can include programming high and low limits for all power distribution outlets of a PDU (step 902). As but one example, such a method can include programming a PDU by way of an interface, as described above. In the very particular example of FIG. 38, current values for each separate power distribution outlet (referred to herein as "outlet") may be examined sequentially, thus an outlet count variable can be initialized (step 904). Of course, the invention should not be construed as being limited to sequential examination/evaluation of outlet current values.

A method 900 can continue by acquiring a current for a given outlet (step 906). Such a step can include any of the various methods noted above, and preferably includes capturing such a value in digital form.

A current value for a power distribution outlet may then be compared to a low limit (step 908). Such a step is preferably performed with software. If an outlet current value (IOUT) is above a low limit (ILOW), a low flag and low timer can be cleared (if not already cleared) (steps 910 and 912). If an outlet current value (IOUT) is below a low limit (ILOW), a low flag for the outlet can be examined (step 914).

If the outlet has not been previously flagged low, a low flag and low timer for the outlet can be set (steps 916 and 918). Setting a low timer can start a low grace period. If the outlet has been previously flagged low, the outlet is in a low grace period. A method 900 can then examine if the low grace period has expired (step 920). If a low grace period has expired, a method can take a predetermined action. In this case, such an action includes issuing a low warning (step 922). Of course, other actions could be taken.

In this way, separate power distribution outlets of the same PDU can be examined for a low current condition, and action taken when a low current condition exists.

A method 900 may then proceed to examine a selected outlet for a high current condition (step 924). Such a step is preferably performed with software. If an outlet current value (IOUT) is below a high limit (IHI), a high flag and high timer can be cleared (if not already cleared) (steps 926 and 928). If an outlet current value (IOUT) is above a high limit (IHI), a high flag for the outlet can be examined (step 924).

If the outlet has not been previously flagged high, a high flag and high timer for the outlet can be set (steps 931 and 932). Setting a high timer can start a high grace period. If, however, the outlet has been previously flagged high, the outlet is in a high grace period. A method 900 can then examine if the high grace period has expired (step 934). If a high grace period has expired, a method 900 can take a predetermined action. In this case, such an action includes tripping a circuit breaker for such an outlet (step 936). Of course, other actions could be taken, including a warning, for example.

In this way, separate power distribution outlets of the same PDU can be examined for a high current condition, and action taken when a high current condition exists.

A method 900 can further include incrementing timers 938. In this way, high and/or low grace periods can continue to run.

A method 900 may then continue cycling, through examination of each outlet current by proceeding to a next outlet of the PDU, or returning to a first outlet of the PDU (steps, 940, 942 and 944).

Figure 39:
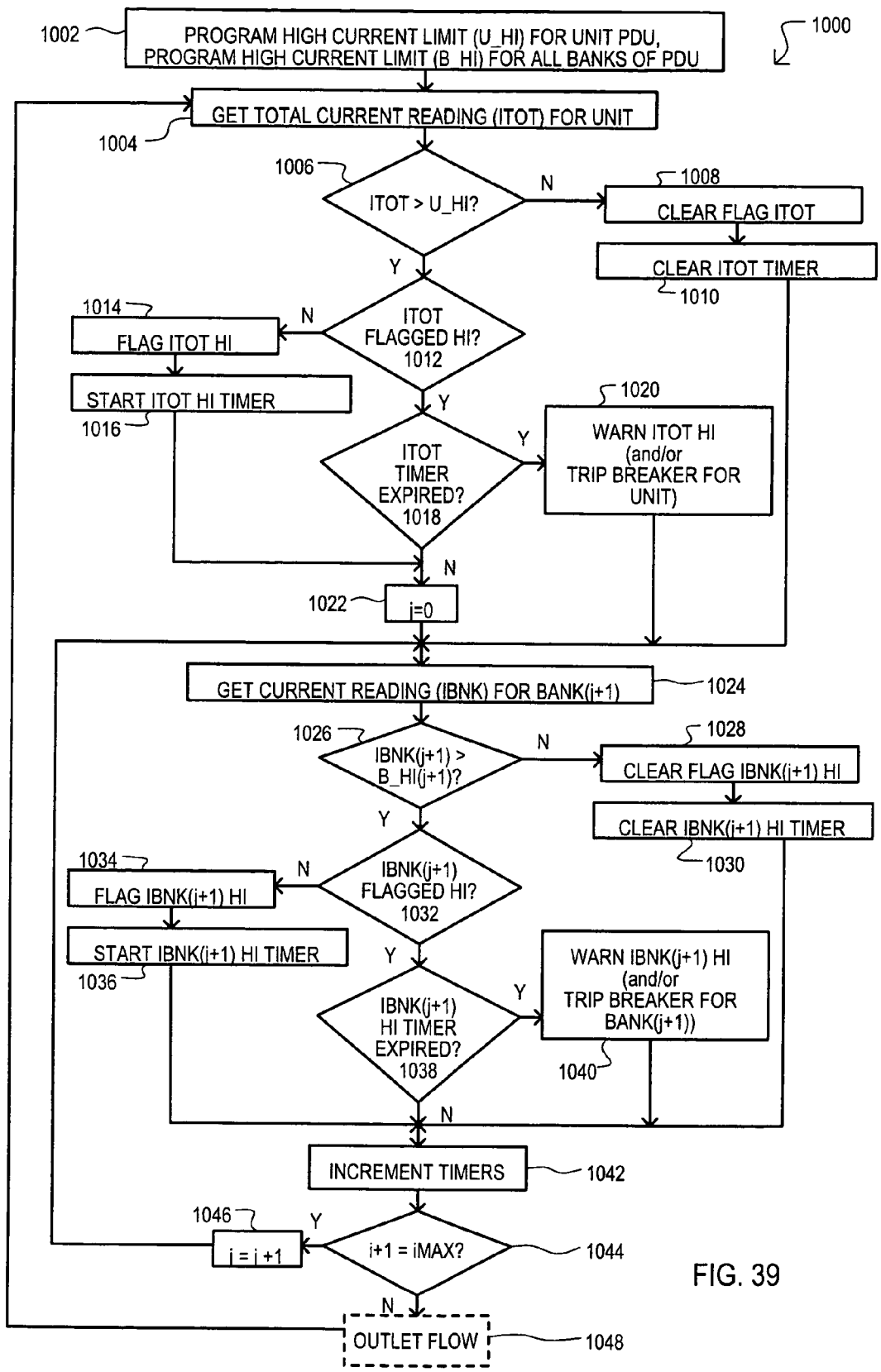
FIG. 39 is a flow diagram of a method according to another embodiment of the present invention.

The present invention can include monitoring/controlling on a bank-by-bank or unit basis, in addition to an outlet-by-outlet basis. One example of such a method is shown in FIG. 39 and designated by the general reference character 1000. A method 1000 can include programming a high limit for a PDU and for all banks within a PDU (step 1002). As but one example, such a method can include programming a PDU by way of an interface, as described above.

In the very particular example of FIG. 39, a current value for an overall PDU (i.e., unit) may first be examined (step 1004). Thus, a method 1000 can continue by acquiring a total current for a PDU (step 1006). Such a step can include any of the various methods noted above (e.g., totaling individual outlet and/or bank values, or separately acquiring such a value). Preferably, a step 1006 includes capturing such a value in digital form.

A method 1000 may then continue in the same general fashion as method 900, but with respect to a unit current value. A current value may then be compared to a high current limit (step 1006). Such a step is preferably performed with software. If the total current value (ITOT) is lower than a high limit (U_Hi), a high flag and high timer can be cleared (if not already cleared (steps 1008 and 1010). If the total current value (ITOT) is lower than a high limit (U_Hi), a high flag can be examined (step 1012).

If the high flag had not been previously set high, the high flag and high timer for the bank or unit can be set (steps 1014 and 1016). Setting the high timer can start a high grace period. If the high flag has previously been set high, the power distribution bank or unit is already in a high grace period. A method 1000 may then examine whether the high grace period has expired (step 1018).

However, as shown by step 1020, in the event of a high current condition, a method 1000 may include issuing a warning in addition to, or instead of, tripping a breaker for a unit.

A method 1000 may then proceed by comparing bank current values to predetermined limits. In the very particular example of FIG. 39, current values for each separate bank may be examined sequentially (step 1024), thus a bank count variable can be initialized (step 1022). Of course, the invention should not be construed as being limited to sequential examination/evaluation of bank current values.

A method 1000 can continue by acquiring a total current for a bank (step 1026). Such a step can include any of the various methods noted above (e.g., totaling individual outlet values, or separately acquiring such a value). Preferably, a step 1026 includes capturing such a value in digital form.

A method 1000 may then continue in the same general fashion as method 900, but with respect to bank current values. In step 1028, the high bank flag and high bank timer may be cleared if the bank current does not exceed the high bank current in a comparison step (step 1026). However, if the comparison step (step 1026) indicates that the bank current exceeds the high bank current, then a check may be made to see if the particular bank has already been flagged high (step 1032). If the high bank current has not previously been set high, then steps 1034 and 1036, may set the high bank current and high bank timer. If the high bank timer had already been set high, a check may be made to see if the high bank timer has expired (step 1038).

If the high bank timer has expired, step 1040 may be performed. As shown by step 1040, in the event of a high current condition, a method 1000 may include issuing a warning in addition to, or instead of, tripping a breaker for a bank.

If the high bank timer has not expired, step 1042 increments the high bank timer. Method 1000 may continue cycling through information of each current bank by proceeding to a next bank of outlets in the PDU (steps 1044 and 1046). If the banks have been examined, the total PDU current may then be or individual outlets may be sampled again as the method 1000 may proceed to step 1048.

FIG. 39 also illustrates how an outlet comparison flow can be incorporated into a unit/bank comparison flow. Thus, box 1048 can include an outlet examination method, such as that shown in FIG. 38, as but one example.

An example of a software program function that may include the various features shown in FIGS. 38 and 39 is listed below. The software program may be stored in memory 238, as but one example.

```
/* -----------------------------------------------------------
   Copyright © 2003 - 2004 by Cyber Switching Inc. ALL RIGHTS RESERVED.
   ----------------------------------------------------------- */
void OutletCurrentBoundTrapHandler(void)
{
    auto unsigned int i;
    auto char tonum[6];
    auto char tcurrent[8];
    auto char tsetcurrent[8];
    auto float tfcurrent;
    if(unitcurrenterrortraptimeout != 0)
    {
        if(gchk_timeout(unitcurrenterrortraptimeout))
            unitcurrenterrortraptimeout = 0;
    }
    if(unitcurrentwarningtraptimeout != 0)
    {
        If(gchk_timeout(unitcurrentwarningtraptimeout))
            unitcurrentwarningtraptimeout = 0;
    }
    tfcurrent = GetTotalCurrent( );
    if(tfcurrent > UNIT_CURRENT_CAPACITY)
    {
        if(unitcurrenterrortraptimeout == 0)
```

-continued

```
      {
         sprintf(tcurrent,"%4.1f",tfcurrent);
         sprintf(tsetcurrent,"%4.1f",BANK_CURRENT_CAPACITY);
         AddLogEntry(LOGEVENT_ERRORUNITCURRENT,tcurrent,tsetcurrent,NULL);   // Log high current violation.
         TrapMyBitsUp(TRAP_UNITCURRENTCRITICAL,i);
         unitcurrenterrortraptimeout = MS_TIMER+10000;  //  10 seconds to next trap.
      }
   }
   if(tfcurrent > UNIT_WARNING_CAPACITY)
   {
      if(unitcurrentwarningtraptimeout == 0)
      {
         sprintf(tcurrent,"%4.1f",tfcurrent);
         sprintf(tsetcurrent,"%4.1f",BANK_CURRENT_CAPACITY);
         AddLogEntry(LOGEVENT_WARUNITCURRENT,tcurrent,tsetcurrent,NULL);   // Log high current violation.
         TrapMyBitsUp(TRAP_UNITCURRENTWARNING,i);
         unitcurrentwarningtraptimeout = MS_TIMER+60000;  //  60 seconds to next trap.
      }
   }
   for(i = 0; i < NUM_BANKS; i++)
   {
      if(bankcurrenterrortraptimeout[i] != 0)
      {
         if(gchk_timeout(bankcurrenterrotraptimeout[i]))
            bankcurrenterrortraptimeout[i] = 0;
      }
      if(bankcurrentwarningtraptimeout[i] != 0)
      {
         if(gchk_timeout(bankcurrentwarningtraptimeout[i]))
            bankcurrentwarningtraptimeout[i] = 0;
      }
      tfcurrent = GetBankCurrent(i);
      if(tfcurrent > BANK_CURRENT_CAPACITY)
      {
         if(bankcurrenterrortraptimeout[i] == 0)
         {
            sprintf(tonum,"% d",i+1);  // Bank Number
            sprintf(tcurrent,"%4.1f",tfcurrent);
            sprintf(tsetcurrent,"%4.1f",BANK_CURRENT_CAPACITY);
            AddLogEntry(LOGEVENT_ERRORBANKCURRENT,tonum,tcurrent,tsetcurrent);
            // Log high current violation.
            TrapMyBitsUp(TRAP_BANKCURRENTCRITICAL,i);
            bankcurrenterrortraptimeout[i] = MS_TIMER+10000;   // 10 seconds to next trap.
         }
      }
      else if(tfcurrent > BANK_WARNING_CAPACITY)
      {
         if(bankcurrentwarningtraptimeout[i] == 0)
         {
            sprintf(tonum,"%d",i+1);  // Bank Number
            sprintf(tcurrent,"%4.1f",tfcurrent);
            sprintf(tsetcurrent,"%4.1f",BANK_WARNING_CAPACITY);
            AddLogEntry(LOGEVENT_WARNBANKCURRENT,tonum,tcurrent,tsetcurrent);    // Log high current violation.
            TrapMyBitsUp(TRAP_BANKCURRENTWARNING,i);
            bankcurrentwarningtraptimeout[i] = MS_TIMER+60000;  // 60 seconds to next trap.
         }
      }
   }
   for(i = 0; i < MAX_OUTLET_NUM; i++)
   {
      if(boundtrapenables[i]&LOBOUNDTRAP_ENABLE)
      {
         if(GetOutletCurrent(i+1) < ocurrentlow[i])
         {
            if(boundtraplotimeouts[i] != 0)
            {
               if(gchk_timeout(boundtraplotimeouts[i]))
               {
                  sprintf(tonum,"%d",i+1);
            sprintf(tcurrent,"%4.1f",GetOutletCurrent(i+1));
            sprintf(tsetcurrent,"%4.1f",ocurrentlow[i]);
            AddLogEntry(LOGEVENT_LOWCURRENT,tonum,tcurrent,tsetcurrent);        //
```

-continued

```
Log low current violation.
    TrapMyBitsUp(TRAP_OUTLETLOWCURRENTWARNING,i);
                boundtrapenables[i] |=
LOBOUNDTRAP_TRAPPED; // set trapped flag.
                boundtraplotimeouts[i] = 0;
            }
        }
        else if(!(boundrapenables[i]&LOBOUNDTRAP_TRAPPED))
        {
            boundtraplotimeouts[i] =
MS_TIMER+boundtraplograce[i];
            if(!boundtraplotimeouts[i])
                boundtraplotimeouts[i]++;
        }
    }
    else
    {
        boundtraplotimeouts[i] = 0;
        boundtrapenables[i] &= ~LOBOUNDTRAP_TRAPPED;   //
Remove trapped flag.
    }
}
if((boundtrapenables[i]&HIBOUNDTRAP_ENABLE) || (boundtrapenables[i]&HIB
OUNDTRIP_ENABLE))
    {
        if(GetOutletCurrent(i+1) > ocurrenthi[i])
        {
            if(boundtraphitimeouts[i] != 0)
            {
                if(gchk_timeout(boundtraphitimeouts[i]))
                {
#ifdef PLUS_MODEL
    if(boundtrapenables[i]&HIBOUNDTRIP_ENABLE)
                setOutletState(i+1,OS_TRIPPED);
#endif
            sprintf(tonum,"%d",i+1);
    sprintf(tcurrent,"%4.1f",GetOutletCurrent(i+1));
    sprintf(tsetcurrent,"%4.1f",ocurrenthi[i]);
    AddLogEntry(LOGEVENT_HIGHCURRENT,tonum,tcurrent,tsetcurrent);    //
Log high current violation;
    if(boundtrapenables[i]&HIBOUNDTRAP_ENABLE)
    TrapMyBitsUp(TRAP_OUTLETHIGHCURRENTWARNING,i);
#ifdef PLUS_MODEL
    if(boundtrapenables[i]&HIBOUNDTRIP_ENABLE)
                {
    TrapMyBitsUp(TRAP_OUTLETTRIPPED,i);
    AddLogEntry(LOGEVENT_OUTLETTRIPPED,tonum,NULL,NULL);    // Log outlet
trip.
                }
#endif
                boundtrapenables[i] |=
HIBOUNDTRAP_TRAPPED; // set trapped flag.
                boundtraphitimeouts[i] = 0;
            }
        }
        else if(!(boundtrapenables[i]&HIBOUNDTRAP_TRAPPED))
        {
            boundtraphitimeouts[i] =
MS_TIMER+boundtraphigrace[i];
            if(!boundtraphitimeouts[i])
                boundtraphitimeouts[i]++;
        }
    }
    else
    {
        boundtraphitimeouts[i] = 0;
        boundtrapenables[i]&= ~HIBOUNDTRAP_TRAPPED;   //
Remove trapped flag.
    }
}
}
}
```

It is understood the above embodiments and portions thereof have been set forth in flow diagrams and a particular computer language, this should not be construed as limiting the invention thereto. One skilled in the art could arrive at alternate arrangements utilizing other programming language, including but not limited to all C variants (e.g., C++), Java, etc. and resulting compiled forms. Further, such embodiments may also comprise hardware design languages, including but not limited to Verilog and VHDL.

In addition, it is understood that other embodiments of this invention may be practiced in the absence of an element/step not specifically disclosed herein. Thus, while methods have been illustrated that include a grace period for high and/or low events, alternate embodiments may not include such grace periods. Further, alternate embodiments may include multiple limits, some which include grace periods and others that do not.

While 8 load devices have been shown, any number of devices can be used in connection with this invention. Similarly, while a network 240 has been shown, computer 250 can communicate directly with one or more of: port 234, processing unit 236, and/or memory with software 238.

Accordingly, while the various particular embodiments set forth herein have been described in detail, the present invention could be subject to various changes, substitutions, and alterations without departing from the spirit and scope of the invention. Accordingly, the present invention is intended to be limited only as defined by the appended claims.

What is claimed is:

1. A current protection apparatus, comprising:
   a current sampling circuit that samples a first current value consisting of a current flowing from a power source to a first load device;
   a processing unit coupled to receive the first current value and controlled by a software program to compare the first current value with a predetermined current limit value to generate a first compare result; and
   a switching circuit coupled between the power source and the first load device, wherein
   the current sampling circuit samples a second current value consisting of the current flowing from the power source to the first load device a first predetermined time period after the first current value is sampled;
   the processing unit receives the second current value and is controlled by the software program to compare the second current value with the predetermined current limit value to generate a second compare result;
   the current sampling circuit samples a plurality of intermediate current values consisting of the current flowing from the power source to the first load device during the first predetermined time period after the first current value is sampled;
   the processing unit receives the plurality of intermediate current values and is controlled by the software program to compare the plurality of intermediate current values with the predetermined current limit value to generate a plurality of intermediate compare results; and
   the switching circuit interrupts the current flowing from the power source to the first load device in response to at least the first compare result indicating that the first current value exceeds the predetermined current limit value, the plurality of intermediate compare results indicating each of the plurality of intermediate current values exceeds the predetermined current limit value, and the second compare result indicating that the second current value exceeds the predetermined current limit value and keeps the current flowing from the power source to the first load device uninterrupted when at least one of the plurality of intermediate current values is less than the predetermined current limit value.

2. The current protection apparatus according to claim 1, wherein:
   the predetermined current limit value is programmable by a user.

3. The current protection apparatus according to claim 1, wherein:
   the first predetermined time period is programmable by a user.

4. The current protection apparatus according to claim 1, wherein:
   the current sampling circuit includes an analog to digital converter.

5. The current protection apparatus according to claim 1, wherein:
   the switching circuit includes a switch selected from the group consisting of a mechanical relay and solid state relay.

6. The current protection apparatus according to claim 1, wherein:
   the current sampling circuit includes a current sensing circuit selected from the group consisting of an isolation step down transformer, a Hall effect device, a sense resistor, and a magnetometer.

7. A current protection apparatus for a power distribution unit, comprising:
   a current sampling circuit that samples a plurality of first current values, each first current value corresponding to a current flowing from one of a plurality of power distribution outlets to a corresponding one of a plurality of load devices;
   a processing unit coupled to receive the plurality of first current values and controlled by a software program to compare each of the plurality of first current values with a corresponding one of a plurality of predetermined current limit values to generate a plurality of first compare results; and
   a plurality of switching circuits, each one of the plurality of switching circuits coupled between one of the plurality of power distribution outlets and a corresponding one of the plurality of load devices, each one of the plurality of switching devices automatically interrupting the corresponding one of the plurality of currents flowing between one of the plurality of power distribution outlets and the corresponding one of the plurality of load devices in response to at least the corresponding one of the plurality of first compare results indicating that the corresponding one of the plurality of first current values is greater than the corresponding one of the plurality of predetermined current limit values wherein
   the plurality of power distribution outlets are divided into a plurality of power distribution outlet banks, each power distribution bank including a bank current value essentially equal to a summation of the plurality of current values of the plurality of power distribution outlets in the corresponding power distribution bank;
   the processing unit compares each of the plurality of bank current values with a corresponding one of a plurality of predetermined bank current limit values; and
   the corresponding ones of the plurality of switching circuits interrupt the current flowing between each power distribution outlet and each load device in the corresponding power distribution bank if the corresponding bank current value is greater than the corresponding predetermined bank current limit value.

8. The current protection apparatus for a power distribution unit of claim 7, wherein:

each one of the plurality of predetermined current limit values is programmable.

9. The current protection apparatus for a power distribution unit of claim 7, wherein:

when the corresponding one of the plurality of compare results indicates that the corresponding one of the plurality of current values is greater than the corresponding one of the plurality of current limit values, the current sampling circuit samples at least a second current value corresponding to the current flowing from the one of the plurality of power distribution outlets to the corresponding one of the plurality of load devices a predetermined time period after the sampling of the corresponding first current value;

the processing unit coupled to receive the at least second current value and controlled by the software program to compare the at least second current value with the corresponding one of a plurality of predetermined current limit values to generate a second compare result;

the corresponding one of the plurality of switching devices interrupting the corresponding one of the plurality of currents flowing between one of the plurality of power distribution outlets and the corresponding one of the plurality of load devices in response to at least the corresponding one of the plurality of first compare results indicating that the corresponding one of the plurality of first current values is greater than the corresponding one of the plurality of predetermined current limit values and at least the second compare result indicating that the second current value is greater than the corresponding one of the plurality of predetermined current limit values.

10. The current protection apparatus for a power distribution unit of claim 9, wherein:

the predetermined time period is programmable by a user.

11. The current protection apparatus for a power distribution unit of claim 9, wherein:

the power distribution unit includes the plurality of power distribution outlets, the current sampling circuit, the processing unit, and the plurality of switching circuits.

* * * * *

UNITED STATES PATENT AND TRADEMARK OFFICE
CERTIFICATE OF CORRECTION

| | | |
|---|---|---|
| PATENT NO. | : 7,630,186 B2 | Page 1 of 1 |
| APPLICATION NO. | : 11/437958 | |
| DATED | : December 8, 2009 | |
| INVENTOR(S) | : Gregory A. Reynolds, Charles H. Reynolds and Ron L. Silorio | |

It is certified that error appears in the above-identified patent and that said Letters Patent is hereby corrected as shown below:

Title page; item (62);

Front page is missing information regarding claims of priority. Please add:

Related U.S. Application Data

Provisional application No. 60/378,342, filed on May 6, 2002.
Application No. 10/431,333 filed on May 6, 2003.
Application No. 10/870,853 filed on Jun. 16, 2004.

Signed and Sealed this
Sixteenth Day of August, 2011

David J. Kappos
*Director of the United States Patent and Trademark Office*